United States Patent
Tucker et al.

(10) Patent No.: US 6,205,453 B1
(45) Date of Patent: *Mar. 20, 2001

(54) SYSTEM AND METHOD FOR IMPLEMENTING SELECTIVELY INDEX ENABLED MULTI-COLUMN LISTS IN A COMPUTER SYSTEM

(75) Inventors: Eric Tucker; David B. Abkowitz, both of Mountain View, CA (US)

(73) Assignee: Oracle Corporation, Redwood Shores, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/042,369

(22) Filed: Mar. 13, 1998

(51) Int. Cl.[7] ....................................... G06F 15/62
(52) U.S. Cl. ...................... 707/503; 707/505; 707/507; 707/509; 707/510; 707/514
(58) Field of Search .................... 707/509, 503, 707/514, 510, 505, 507

(56) References Cited

U.S. PATENT DOCUMENTS

| | | | |
|---|---|---|---|
| 5,185,857 | * 2/1993 | Rozmanith et al. | 707/507 |
| 5,208,907 | * 5/1993 | Shelton et al. | 707/505 |
| 5,272,628 | * 12/1993 | Koss | 707/503 |
| 5,317,306 | * 5/1994 | Abraham et al. | 345/118 |
| 5,317,686 | * 5/1994 | Salas et al. | 707/503 |
| 5,321,804 | * 6/1994 | Kusaba et al. | 707/509 |
| 5,337,405 | * 8/1994 | Lindauer et al. | 707/503 |
| 5,359,729 | * 10/1994 | Yarnell et al. | 707/2 |

OTHER PUBLICATIONS

John Kaufeld, Paradox 5 for Windows for Dummies, 1994 Published by IDG Books Worldwide, Inc. pp. 92–99.*

* cited by examiner

Primary Examiner—Stephen S. Hong
Assistant Examiner—Wasseem H. Hamdan
(74) Attorney, Agent, or Firm—Wagner, Murabito & Hao LLP

(57) ABSTRACT

System and method for implementing selectively index enabled multi-column lists in a graphical user interface for a computer system. The graphical user interface contains a table of entries organized by columns. The columns are displayed vertically adjacent to one another. A user selectable vertical line (the divider line) can be moved from an extreme left column position to a position between adjacent columns. When a column is between the divider line and the extreme left column position, the column becomes index enabled. A single column (e.g., the left most column) or multiple columns can be index enabled simultaneously. A column can be positioned between the divider line and the extreme left column position by column reordering, e.g., leaving the divider line in a fixed position and dragging and dropping the column from a position right of the divider line. By making a column index enabled, an index of the items of the column is made and when indexed, every unique column item is represented only once in the column by an index item. A user selectable two position representation (e.g., a triangle, arrow, etc.) can be used to open (expand) or close the index item. When closed, all information contained within the index item is collapsed in the user interface. When expanded, this information can be displayed in the user interface. The present invention advantageously provides advantages of tree-views (e.g., the ease of searching through data in a hierarchical format) while also offering advantages of multi-column list displays (e.g., volume of information presentation).

19 Claims, 20 Drawing Sheets

1/20

| NAME | ADDRESS | PHONE |
|---|---|---|
| ROBERT | ELM ST | 555-1111 |
| WILLIAM | OAK ST | 555-2222 |
| HARRY | MARKET ST | 555-3333 |
| STEVE | FIRST ST | 555-4444 |
| *** | *** | *** |
| NAME(N) | ADDRESS(N) | PHONE(N) |

SYSTEM AND METHOD FOR IMPLEMENTING SELECTIVELY INDEX ENABLED MULTI-COLUMN LISTS IN A COMPUTER SYSTEM

BACKGROUND OF THE INVENTION (1) Field of the Invention

The present invention relates to the field of graphic user interfaces (GUIs) within computer systems. More specifically, the present invention relates to a GUI that is particularly useful in locating information in a large tabular display of information to a computer user. The present invention is useful in the field of pruning a search as well as managing, searching and sorting large amounts of tabular data.

(2) Prior Art

Current user interface (UI) controls used to display lists of related information do not provide adequate methods for organizing and navigating very large amounts of information. In the past, multi-column lists (MCL) and tree-view user interfaces (hierarchical trees) have been used to display lists of related information.

FIG. 1A illustrates an exemplary MCL 10 user interface which is organized as a table of rows including three columns including: a name column 10a; an address column 10b; and a phone column 10c. In this example, N rows are shown for each column. The ith row of each of the columns contains data related to a common record. This MCL user interface 10 is a flat list of items each having a consistent set of attributes. The MCL user interface 10, while providing a large volume of data, lacks any real hierarchical data organization and therefore searching records can be cumbersome.

FIG. 1B illustrates the prior art tree-view user interface 60. Within the tree-view 60, data is organized by a particular attribute of the data starting with a root 20 having branches that contain deeper levels of hierarchy. In this example, the hierarchical organization is based on a corporate position attribute with the president 20 as the root and the root having three branches of vice-presidents 22, 24 and 26. Each vice-president branch also contains sub-branches 28–44. The lowest level (leaf level) of hierarchy is the level including items 46–58. Although organizing the data according to a specific hierarchy, and thereby facilitating user searches, the tree-view is nevertheless limited in the amount of data that is presented to the user. For instance, in this exemplary tree-view 60 only names are presented for each data item. To obtain more information of the data item, the user needs to select a data item and move to a different view.

Particularly, it would be advantageous to provide users with the ability to factor/index the essential content from a long list of information. For example, an "in-box" may contain as many as 500 messages from 40 senders. It is desired to interactively index the 40 senders and then view the data from any one sender to access the messages from that sender. The ability to factor/index the essential context from a long list of information is typically performed by filtering in both the MCL and the view-tree user interfaces. In these cases, filtering is typically done in a separate dialog and therefore the act of filtering is done out-of-context and, unfortunately, this impedes the ability of a user to move fluidly within the user interface between altering the filter and reading its results. Another drawback of filtering within in the prior art is that the user must first know the results for which he/she is looking, a priori. Additionally, filtering by more than one criteria often involves the creation of complex Boolean expressions that can be cumbersome to use and error-prone in the prior art.

It would be advantageous to allow users the ability to quickly and easily restructure a hierarchy in order to organize and view the large amounts of content from different perspectives. The MCL user interface is not typically used to display hierarchical relationships between data. However, the tree-view user interfaces are used to display hierarchical information and typically support restructuring in one of two ways. First, by allowing the user to change the tree root and/or manipulating a position of a node or second, by hardwiring buttons to different hierarchical representations. Unfortunately, neither of these two mechanisms provide a fluid interface between reorganization and information display. Moreover, it would be advantageous to allow users to quickly and fluidly flatten a hierarchy, in whole or in part, e.g., to move a body of information between being represented as a flat list and being represented as a hierarchy. Although the MCL user interface is well suited to displaying flat lists, it is not typically used to display hierarchies. Further, tree-view user interfaces are not well suited to fluid restructuring and they are severely limited in their ability to display information as a flat list.

It would also be advantageous to allow users the ability to enforce a particular sort order, e.g., sort all the employees by city, then sort the employees of each city by last name. Tree-view user interfaces do not typically support sorting, and if they do, it is typically limited to only a straight alphabetical sort. With a basic process in place, most MCL user interfaces support a type of ordered sorting. However, it is not enforced and is only one method. For instance, if MCL 10 (FIG. 1A) is first sorted by city address and then sorted by last name, those names that are repeated are typically sorted by city. It would be advantageous yet to provide users with the ability to visually correlate items organized hierarchically with information about each item in particular. Tree-view user interfaces do not typically display more than the title of any given displayed element and the MCL user interfaces are not typically used to display hierarchical information.

In view of the rational presented above, current user interface controls used to display lists of related information do not provide adequate methods for organizing and navigating very large amounts of information.

SUMMARY OF THE INVENTION

Accordingly, the present invention provides a user interface that combines the sorting and column reordering capabilities of the standard multi-column list (MCL) and also the selectively disclosure capabilities of the standard tree-view user interface. The present invention allows hierarchy to be represented by providing a container out of an item of a column that appears more than once.

With this in mind, a system and method are described herein for implementing selectively index enabled multi-column lists in a graphical user interface for a computer system. The graphical user interface contains a table of entries organized by columns. The columns are displayed vertically adjacent to one another. A user selectable vertical line (the divider line) can be moved from an extreme left column position to a position between adjacent columns. When a column is between the divider line and the extreme left column position, the column becomes index enabled. A single column (e.g., the left most column) or multiple columns can be index enabled simultaneously.

A column can be positioned between the divider line and the extreme left column position by column reordering, e.g., leaving the divider line in a fixed position and dragging and dropping the column from a position right of the divider line. By making a column index enabled, an index of the entries of the column is made and when indexed, every unique column item is represented only once in the column by an index item. A user selectable two position representation (e.g., a triangle, an arrow, etc.) can be used to open (expand) or close the index item. When closed, all information to the right of and associated with the index item is collapsed in the user interface. When expanded, information to the right and associated with the index item is displayed in the user interface.

When a first and a second column are index enabled, the children of the second column, e.g., the column of lower hierarchical order, are indexed separately depending on their parent. In other words, children (in the second column) of a first index item in the first column are indexed independently of the children (in the second column) of a second index item in the first column. In this example, the second column is adjacent to and to the right of the first column. In this manner, the position of the index enabled columns of the present invention dictates the hierarchical ordering of the items.

The present invention advantageously provides advantages of tree-views (e.g., ease of searching through data in a hierarchical formal) while also offering advantages of multi-column list displays (e.g., volume of information presentation) in a novel graphical user interface.

More specifically, in a computer system having a processor coupled to bus, a memory coupled to the bus and a display screen, embodiments of the present invention include a computer implemented method of providing a user interface, the method comprising the steps of: a) generating and displaying a plurality of columns of information; b) generating and displaying a divider line; c) allowing the divider line to be positioned between the plurality of columns wherein the position of the divider line defines which columns are index enabled and which columns are not index enabled; d) index enabling the columns that are defined as index enabled, the step d) comprising the steps of: d1) indexing all items within a respective index enabled column depending on the hierarchical level of the respective index enabled column, the hierarchical level being dependent on the position of the respective index enabled column; and d2) displaying only index items within the respective index enabled column; and d3) repeating steps d1) and d2) for each index enabled column; and e) allowing a first column of the plurality of columns to be moved from a current position to a new position. Embodiments include the above and wherein step d2) comprises the steps of: displaying an expansion button within each displayed index item of the respective index enabled columns; hiding from view any information associated with a displayed index item upon an expansion button of the index item being selected to a closed state; and displaying information associated with a displayed index item upon an expansion button of the index item being selected to an open state.

BRIEF DESCRIPTION OF THE DRAWINGS

FIG. 1A is an illustration of a prior art multi-column list graphical user interface for displaying information.

DETAILED DESCRIPTION OF THE INVENTION

In the following detailed description of the system and method for implementing selectively indexable multi-column lists in a graphical user interface, of the present invention, numerous specific details are set forth in order to provide a thorough understanding of the present invention. However, it will be obvious to one skilled in the art that the present invention may be practiced without these specific details. In other instances well known methods, procedures, components, and circuits have not been described in detail as not to unnecessarily obscure aspects of the present invention.

I. NOTATION AND NOMENCLATURE

Some portions of the detailed descriptions which follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. A procedure, logic block, process, step, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "computing" or "calculating" or "determining" or "displaying" or the like, refer to the action and processes of a computer system (e.g., 112 of FIG. 8), or similar electronic computing device, that manipulates and transforms data represented as physical (electronic) quantities within the computer system's registers and memories into other data similarly represented as physical quantities within the computer system memories or registers or other such information storage, transmission or display devices.

II. COMPUTER SYSTEM ENVIRONMENT

Figure 8:
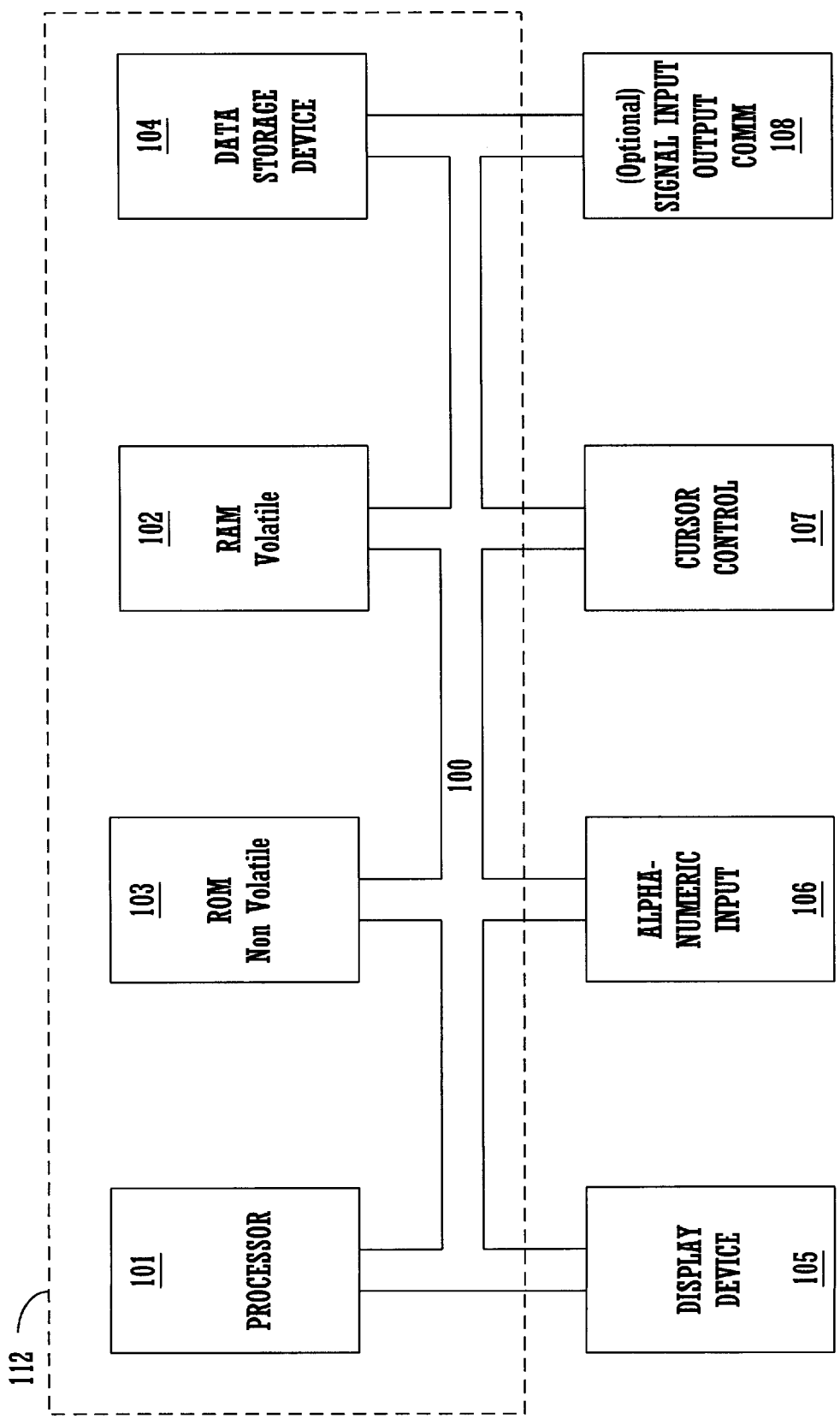
FIG. 8 illustrates a block diagram of a general purpose computer system that can be used to render display buttons in accordance with the present invention.

Refer to FIG. 8 which illustrates a computer system 112. Within the following discussions of the present invention, certain processes and steps are discussed (e.g., process 700) that are realized, in one embodiment, as a series of instructions (e.g., software program) that reside within computer readable memory units of system 112 and executed by processors of system 112. When executed, the instructions cause the computer system 112 to perform specific actions and exhibit specific behavior which is described in detail to follow.

In general, computer system 112 used by the present invention comprises an address/data bus 100 for communicating information, one or more central processors 101 coupled with the bus 100 for processing information and instructions, a computer readable volatile memory unit 102 (e.g., random access memory, static RAM, dynamic, RAM, etc.) coupled with the bus 100 for storing information and instructions for the central processor(s) 101, a computer readable non-volatile memory unit (e.g., read only memory, programmable ROM, flash memory, EPROM, EEPROM, etc.) coupled with the bus 100 for storing static information and instructions for the processor(s) 101. System 112 also includes a mass storage computer readable data storage device 104 such as a magnetic or optical disk and disk drive coupled with the bus 100 for storing information and instructions. Computer system 112 also includes a display device 105 coupled to the bus 100 for displaying information to the computer user, an alphanumeric input device 106 including alphanumeric and function keys coupled to the bus 100 for communicating information and command selections to the central processor(s) 101, a cursor control device 107 coupled to the bus for communicating user input information and command selections to the central processor(s) 101, and an optional signal generating device 108 coupled to the bus 100 for communicating command selections to the processor(s) 101.

The display device 105 can be any screen (e.g., cathode ray tube, flat panel display, etc.) suitable for displaying alphanumeric and other graphic information to a user.

III. SELECTIVELY INDEXABLE MULTI-COLUMN LIST OF THE PRESENT INVENTION, GENERALLY

The present invention provides a user interface for displaying information to a user of a computer system. The present invention provides selectively indexable ("index enabled") multi-column lists or SIMCL. The SIMCL enables individual columns to be made "indexable" (e.g., index enabled) at the option of the user. If no column is so enabled, then the present invention, in this mode of operation, resembles a standard multi-column list. If all columns are so enabled, then the present invention provides a tree structure represented as a multi-column list. Within the present invention, the columns of the multi-column list can be reordered thereby restructuring the hierarchy. The typical mode of operation for the present invention is to have some columns of the list indexed and some not.

By making a column indexable (and collapsing the index items remaining in the columns) in accordance with the present invention, an index of the column contents is made. It is appreciated that when a column is made indexable, it is initially collapsed by default in one embodiment of the present invention. When a column is indexed in accordance with the present invention, every unique item is represented only once in the column. The user can expand an index item, when there is more than one instance of it, to see all the instances contained within the item. For instance, assume an inbox in accordance with the present invention contains 500 messages from 40 different people and the author column is index enabled. In this case, the author column would contain only 40 names (e.g., index items) instead of 500 names. Each name (that contained more than one message) would then be accompanied by an expansion button (a graphical item displayed on the screen 105). When expanded, the present invention then automatically reveals (e.g., expands to display) all the messages from that author.

In accordance with the present invention, columns that have been made indexable (index enabled) are ordered hierarchically from left to right on screen 105. By reordering the columns that are index enabled, the hierarchy is automatically reordered. The highest hierarchical level is the left most indexable column position and the lowest hierarchical level is the right most indexable column position. Moving the column data between hierarchical levels is performed within the present invention by moving the column's left-right position.

The SIMCL of the present invention also supports ordered sorting. For instance, if the user sorts a column on the left, e.g. "name," and then sorts a column on the right, e.g., "date," the rows in the result would be sorted by name and wherever there is a name that appears more than once, it would be sorted by date. This can be extended, at once, to all columns that are index enabled. The ability to reorder the columns multiplies this effect. Therefore, if the user drags the date column to the left of the name column, the context is now ordered by date and anywhere a date is repeated, the names with that date are sorted.

IV. USER INTERFACE DESCRIPTION

Figure 1B:
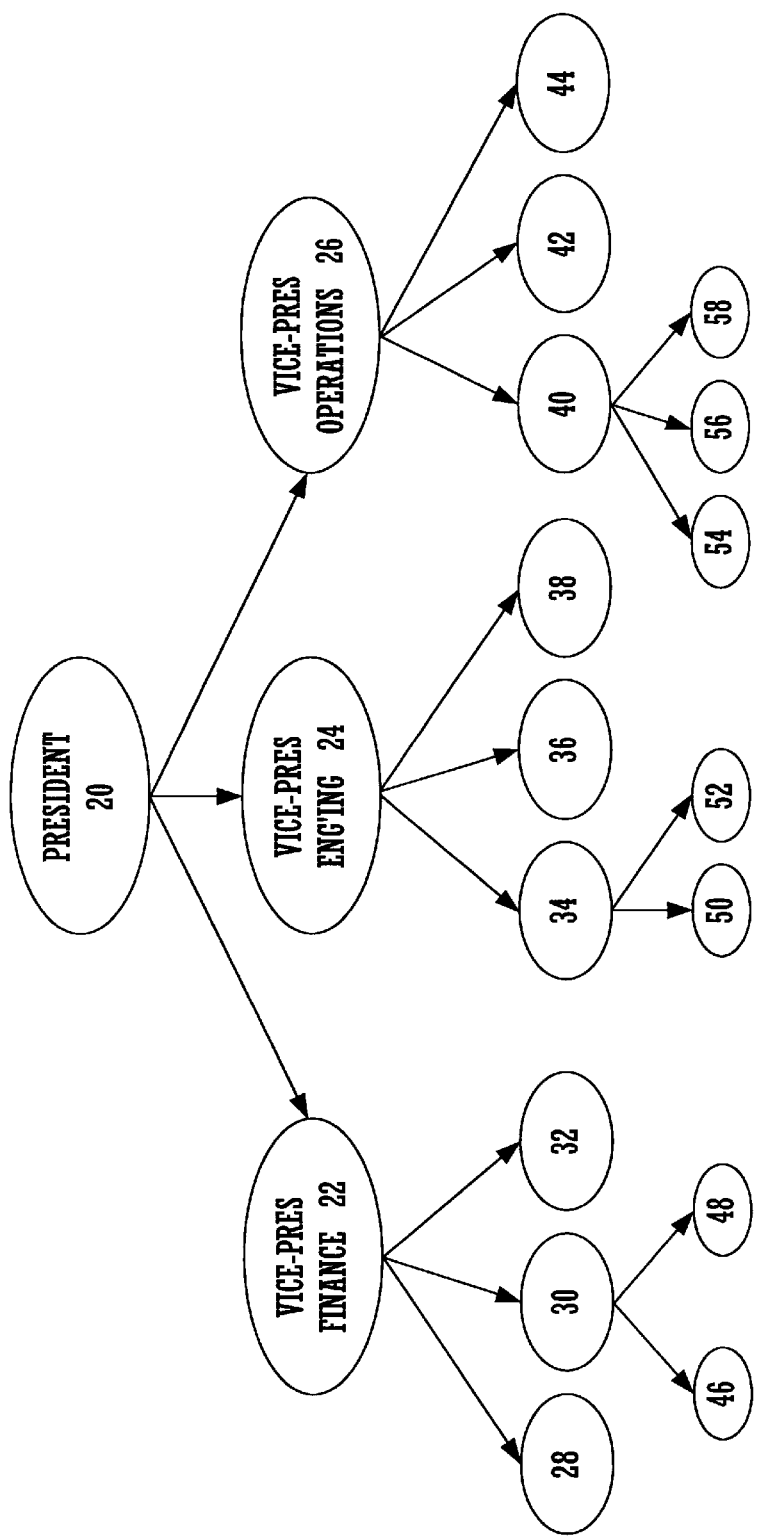
FIG. 1B is an illustration of a prior art tree view graphical user interface for displaying information.
Figure 2A:
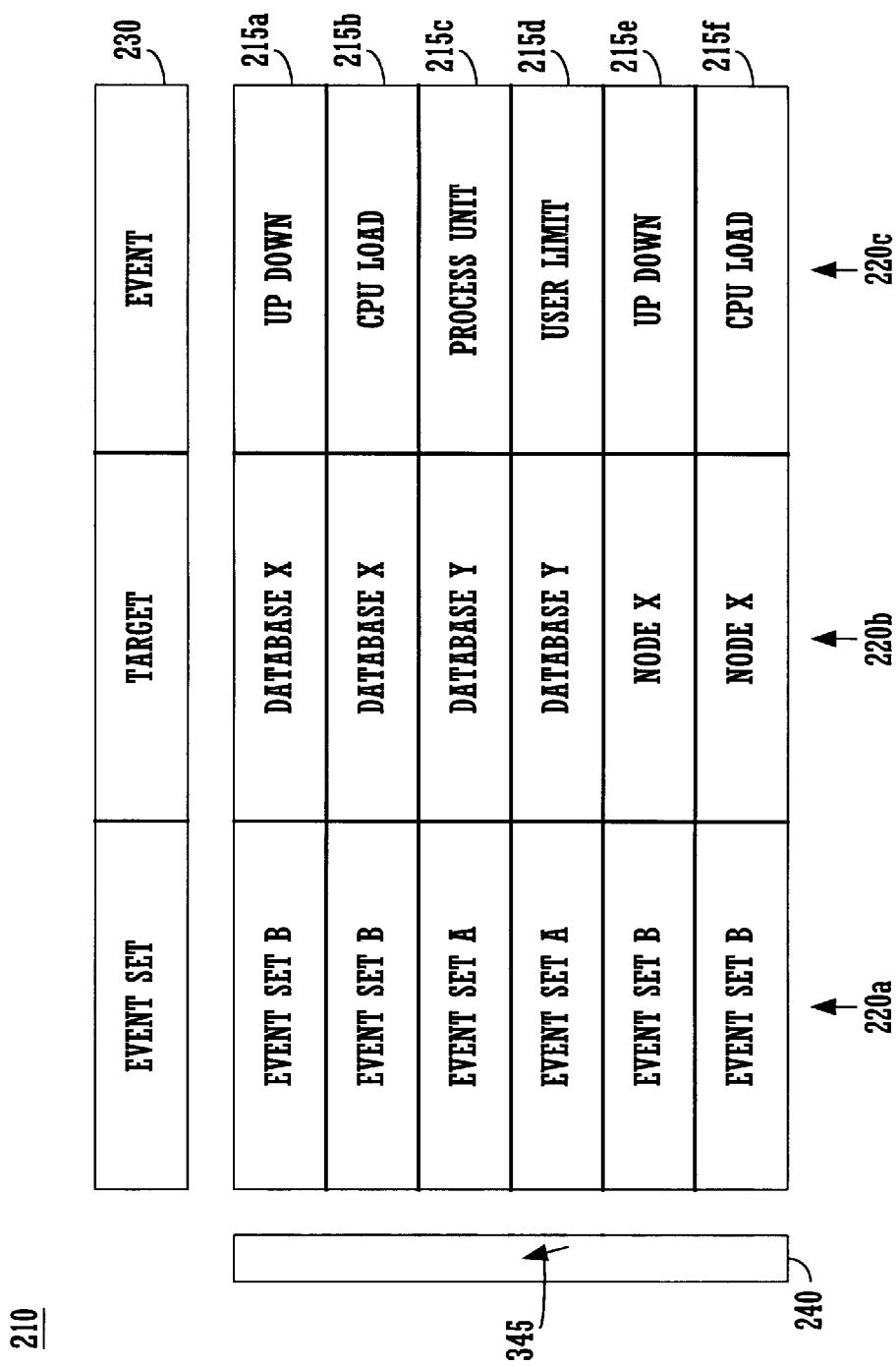
FIG. 2A illustrates an exemplary graphical user interface display in accordance with the present invention with no columns index enabled.

A. Columns and Divider Line. FIG. 2A illustrates the components of the SIMCL user interface in accordance with the present invention. The contents of FIG. 2A represent an example display 210 of the SIMCL user interface of the present invention as displayed on a display screen 105 of computer system 112. The SIMCL user interface display 210 contains a set of data columns (e.g., 220a–220c) arranged vertically, each column having a column identifier or "header" displayed within a header region 230. The columns 220a–220c contain individual entries or "rows." The $i^{th}$ row of the columns contain entries that are related to each other (e.g., the entries of the row collectively form a record). In this example, the columns are called the "event set" column 220a, the "target" column 220b, and the "event" column 220c. There are only two unique data items in column 220a, three unique data items in column 220b and four unique data items in column 220c. There are six rows of data, rows 215a–215f. With respect to row 215d, the "event set A" data, the "database Y" data and the "user limit" data are all associated with the same record.

Also displayed in FIG. 2A is a vertically oriented divider line 240. In one embodiment of the present invention this divider line 240 is a thick black line oriented such that its long axis runs parallel to the long axis of the columns. The divider line 240 can be selected by a user and moved (e.g., dragged) left and right to positions in between the columns 220a–220c. A cursor position image 345 ("cursor") is also shown on the divider line 240. In accordance with the present invention, a column becomes indexable (e.g., index enabled) when it lies to the left of the divider line 240. Therefore, in the exemplary SIMCL user interface display 210 of FIG. 2A, none of the columns 220a14 220c are indexable because they all lie to the right of the divider line 240. The divider line 240 separates those columns that are index enabled (left of the line) from those columns that are not index enabled. Hierarchical organization is supported for columns that are index-enabled.

The present invention in the configuration 210 can emulate a multi column list user interface by moving the divider line 240 so that no columns are index enabled. As described further below, the present invention can also emulate a tree structure user interface by moving the divider line 240 so that all columns are index enabled. Configurations of the present invention where the divider line 240 is positioned between the two extremes mentioned above provide unique and advantageous display capabilities.

Figure 2B:
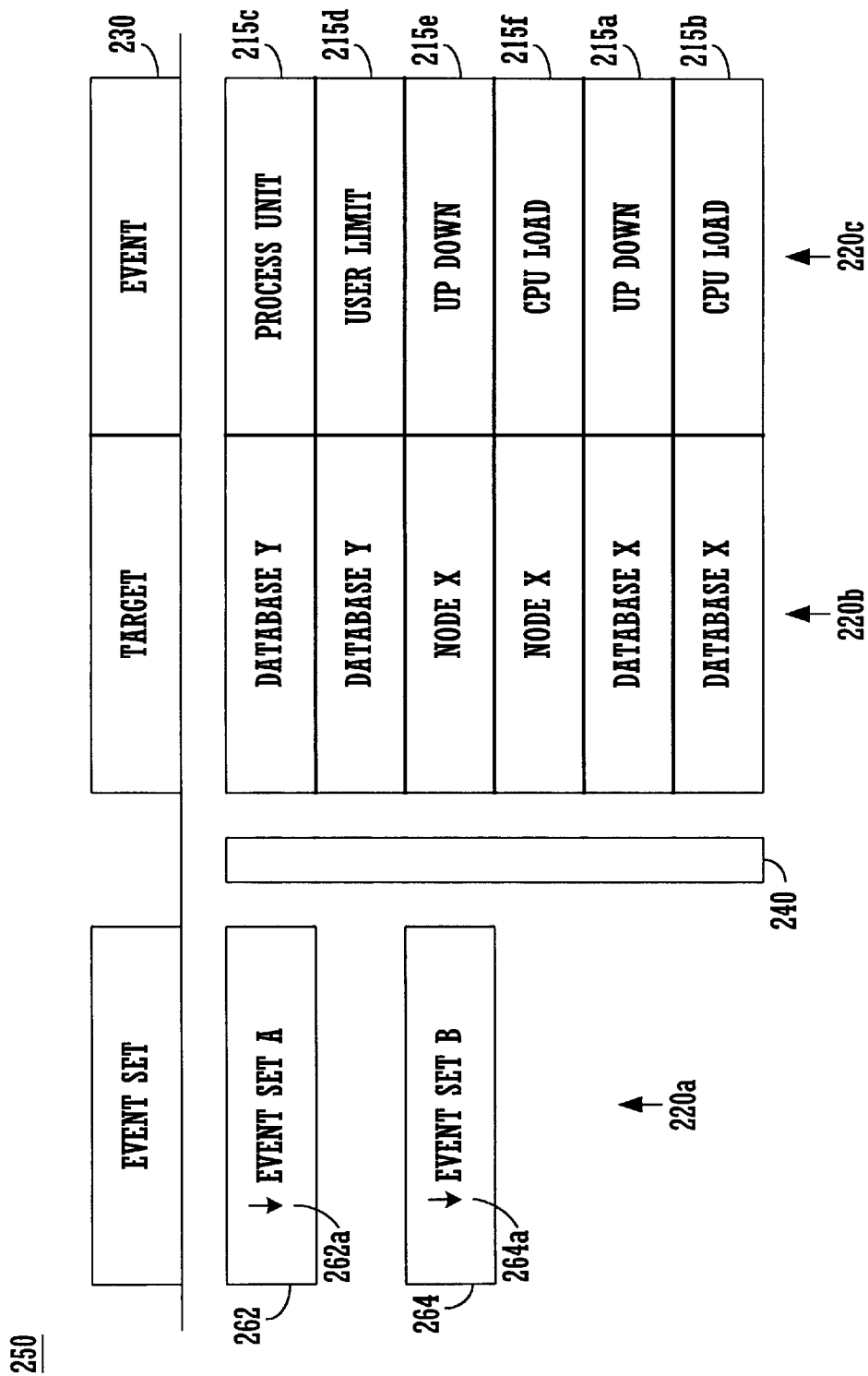
FIG. 2B illustrates an exemplary graphical user interface display in accordance with the present invention with the "event set" column index enabled with both index items open.

B. Index Enable Columns. FIG. 2B illustrates the components of an SIMCL user interface display 250 in accordance with the present invention as displayed on a display screen 105 of computer system 112. SIMCL user interface 250 is similar to SIMCL user interface display 210 (FIG. 2A), however, the divider line 240 is moved over (e.g., dragged and dropped) one column to the left by the user. In this example, the divider line 240 is positioned between column 220a and column 220b. In accordance with the present invention, this action causes column 220a to become index enabled. In this mode, each item of column 220a is indexed and, as such, each unique item is displayed within column 220a only once. In other words, when a column is index enabled in accordance with the present invention, those items of which there is more than one instance are reduced to a single instance (e.g. an index item), per hierarchical level, and the index item receives an associated expansion button.

The result of index enable on column 220a, as shown in FIG. 2B, is an "event set A" index item 262 and an "event set B" index item 264. The remainder, e.g., the duplicate items or instances, of column 220a are not displayed. By making a column indexable within the present invention, the user can quickly reduce the amount of information that must be searched within the column in order to locate desired data provided the column contains some duplicate items. Typically, during the index process the column is also sorted, but sorting does not necessarily have to be tied with the index enable.

Within the present invention, a column can be index enabled by dragging it to the left of the divider line 240 or by dragging the divider line 240 to the right of the column. However, in one embodiment, a column can only be indexed if the column to its left is already indexed or it is the left most column.

When a column becomes index enabled, a parent-child relationship is formed between the index items of the index enabled column and other columns to the right of the index enabled column. For instance, the items within column 220b and within rows 215c and 215d (and within column 220c and within rows 215c and 215d) are children of index item 262 and are said to be "contained within" or "associated with" index item 262. Further, the items within column 220b and within rows 215e, 215f, 215a, and 215b (and within column 220c and within rows 215e, 215f, 215a, and 215a) are children of index item 264 and are said to be "contained within" or "associated with" index item 264.

C. Expansion Button. Each of the index items 262 and 264 also contains an individual expansion button 262a, 262b, respectively. The expansion button is a graphical display having at least two different visual representations. One representation is used to convey that the index item is open (or expanded) and a second visual representation is used to convey that the index item is closed (e.g., its associated data is "collapsed"). Within the scope of the present invention, any of a number of different graphical representations can be used to convey the above two modes. In the example shown in FIG. 2B, an expansion button represented as a graphical representation of an arrow pointing downward indicates an open or expanded index item and an expansion button represented as a graphical representation of an arrow pointing to the right (or left) indicates a closed index item. In an alternative embodiment, a rotating triangle image (either pointing downward or to the side) can also be used as the expansion button.

In operation, when the expansion button for a particular index item is open, then all of the rows of data within the user interface of the present invention that are associated with the index item (e.g., that are contained within the index item), and positioned to the right of the index item, are displayed. The above is true only for an index item that is displayable. For instance, the items within column 220b and 220c that reside within rows 215c and 215d are associated with index item 262, e.g., each of these rows has an "event set A" value in column 220a. When expansion button 262a is "open" (as shown), these associated items are displayed within user interface 250. Also, the items within column 220b and 220c that reside within rows 215e, 215f, 215a and 215b are associated with index item 264, e.g., each of these rows has an "event set B" value in column 220a. When expansion button 264a is "open" (as shown), these associated items are displayed within user interface 250.

Figure 2C:
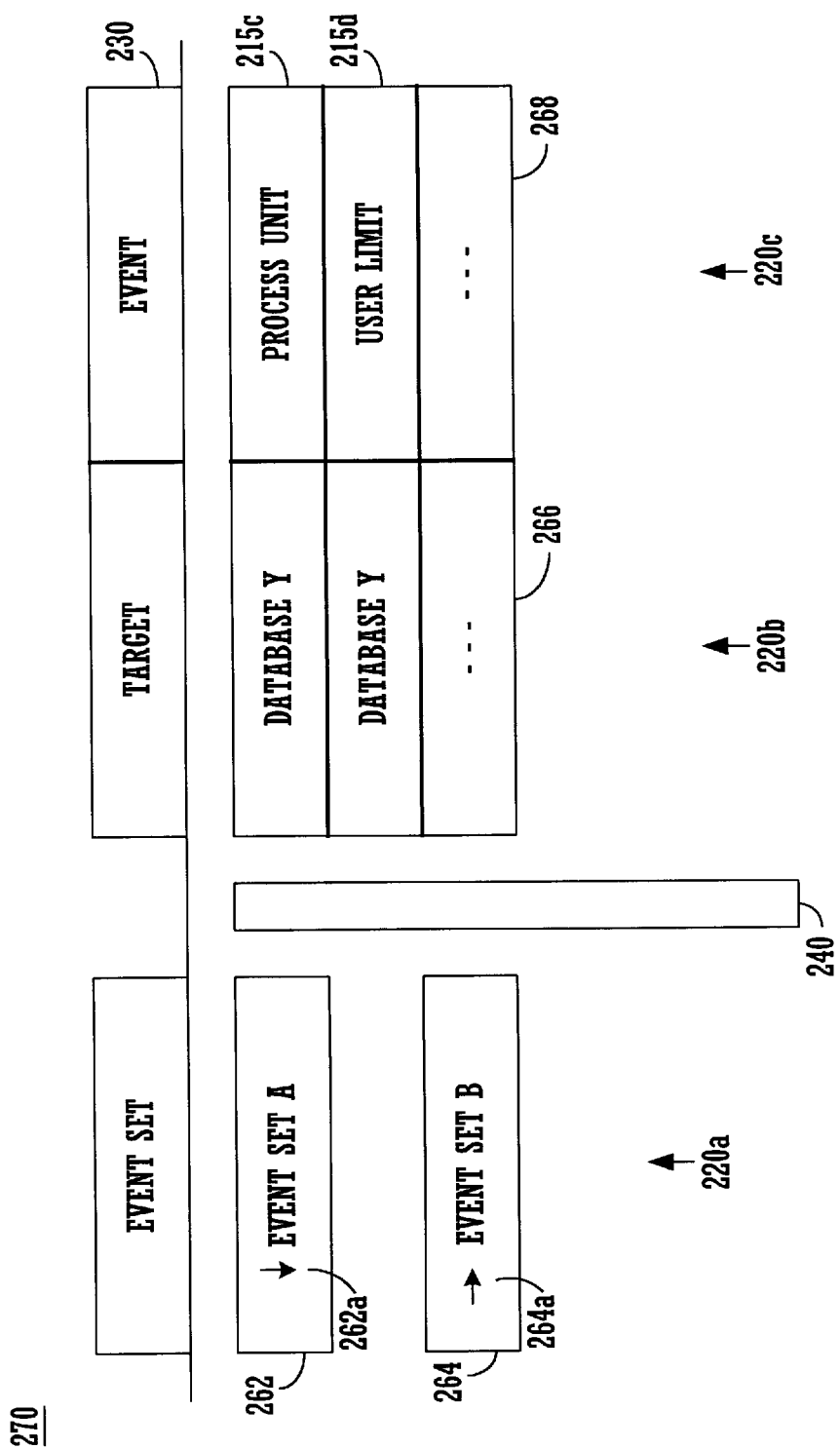
FIG. 2C illustrates an exemplary graphical user interface display in accordance with the present invention with the "event set" column index enabled with a first index item open and a second index item closed.

FIG. 2C illustrates the components of an SIMCL user interface display 270 in accordance with the present invention as displayed on a display screen 105 of computer system 112. SIMCL user interface display 270 is similar to SIMCL user interface display 250 (FIG. 2B), however, the expansion button 264a of index item 264 is in the closed position (e.g., pointing to the left or right side). In this example, all of the items that are associated with index item 264 (e.g., items within column 220b and 220c that reside within rows 215e, 215f, 215a and 215b) are not displayed. In this mode, it is said that these items are "collapsed" into a small visual representation 266 and 268 displayed within user interface 270. In one embodiment, the small visual representation is a small line displayed adjacent to the closed index item 264a. The small visual representation indicates that there is content related to the closed index item 264 but this content is not currently allowed to be displayed. As shown in FIG. 2C, one index item 262 can be open while the other 264 is closed. As shown above, the contents of an index items are not displayed when the expansion button of the index item is closed.

By closing some or almost all of the index items of a column that is indexed enabled, the user can readily focus on the information related to the index items that remain open. For instance, if an author column of an email display is index enabled and all authors but one are closed, then only those messages from that one author will be displayed by the present invention. The user can then readily focus on those pertinent messages.

Figure 2D:
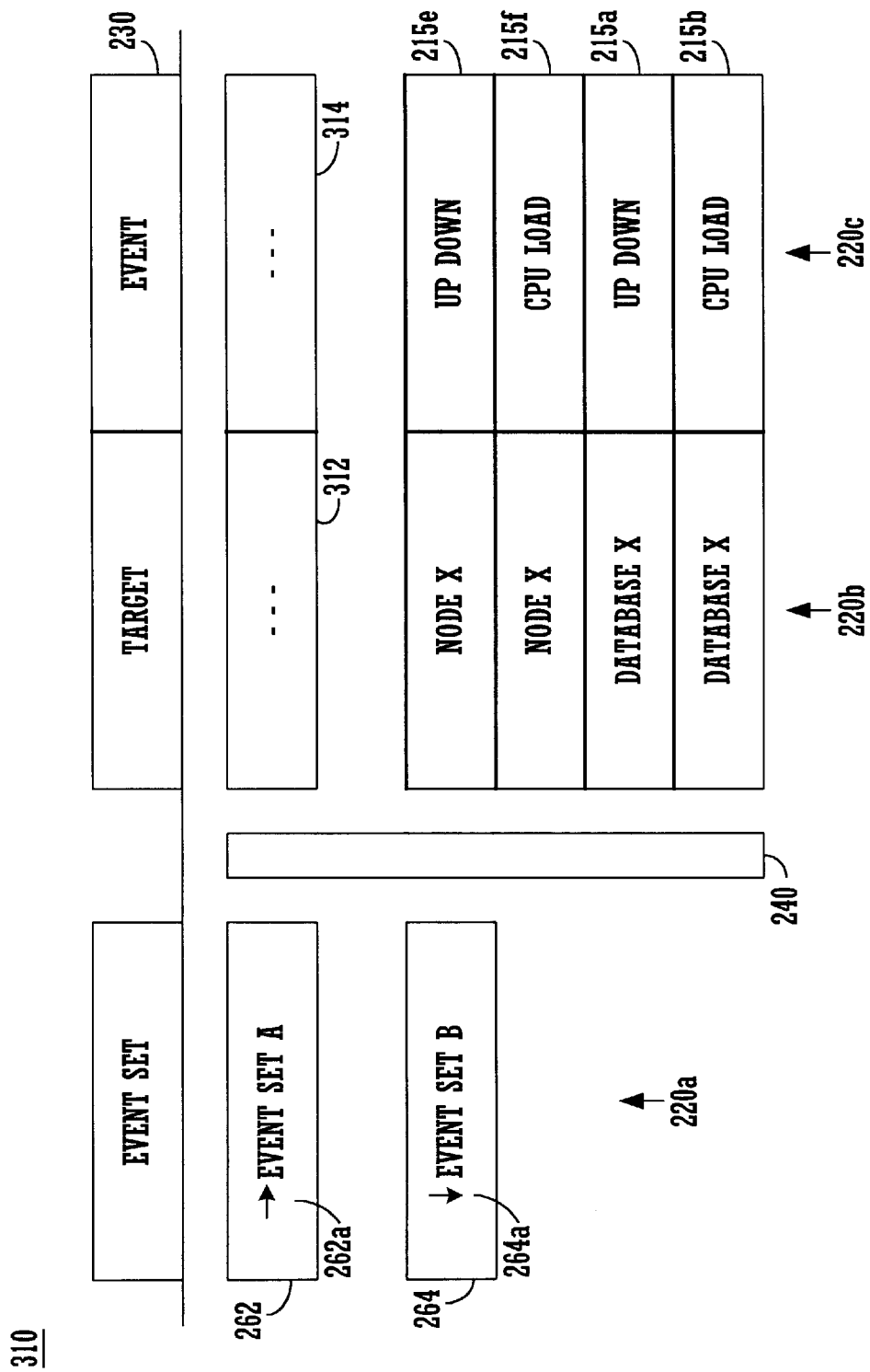
FIG. 2D illustrates an exemplary graphical user interface display in accordance with the present invention with the "event set" column index enabled with the first index item closed and a second index item open.

FIG. 2D illustrates the components of an SIMCL user interface display 310 in accordance with the present invention as displayed on a display screen 105 of computer system 112. SIMCL user interface display 310 is similar to SIMCL user interface display 250 (FIG. 2B), however, the expansion button 262a of index item 262 is in the closed position (e.g., pointing to the left or right side). In this example, all of the items that are associated with index item 262 (e.g., items within column 220b and 220c that reside within rows 215c 215d) are not displayed. In this mode, it is said that these items are "collapsed" into a small visual representation 312 and 314 displayed within user interface 310. In one embodiment, the small visual representation is a small line displayed adjacent to the closed index item 262a. The small visual representation indicates that there is content related to the closed index item 262 but this content is not currently allowed to be displayed. As shown in FIG. 2D, one index item 264 can be open while the other 262 is closed.

Also within the present invention, all of the index items within a column that is index enabled can be closed. In this case, all of the items associated with the closed index items will be collapsed (see FIG. 3F for an example of this mode of operation).

D. Column Reordering. Within the present invention, the order of the columns (e.g., from left to right) within the user interface can be changed. Column reordering is done by dragging the column header to the desired location, either before, after or between other column headers. The divider line 240 does not move as a result of the column reordering operation of the present invention. By reordering the position of columns that are index enabled, the organizational hierarchy of the user interface changes. As discussed above, the left most index enabled column is at the highest hierarchical level.

Moving a column displaces the other columns in relation to the divider line 240. When a column is being moved, feedback indicates where it is to land on mouse up. If the moving column is dropped onto the left half of another column, then that column is displayed to the right of the dropped column. If the moving column is dropped onto the right half of another column, that column remains in place with the dropped column to its right.

Figure 3A:
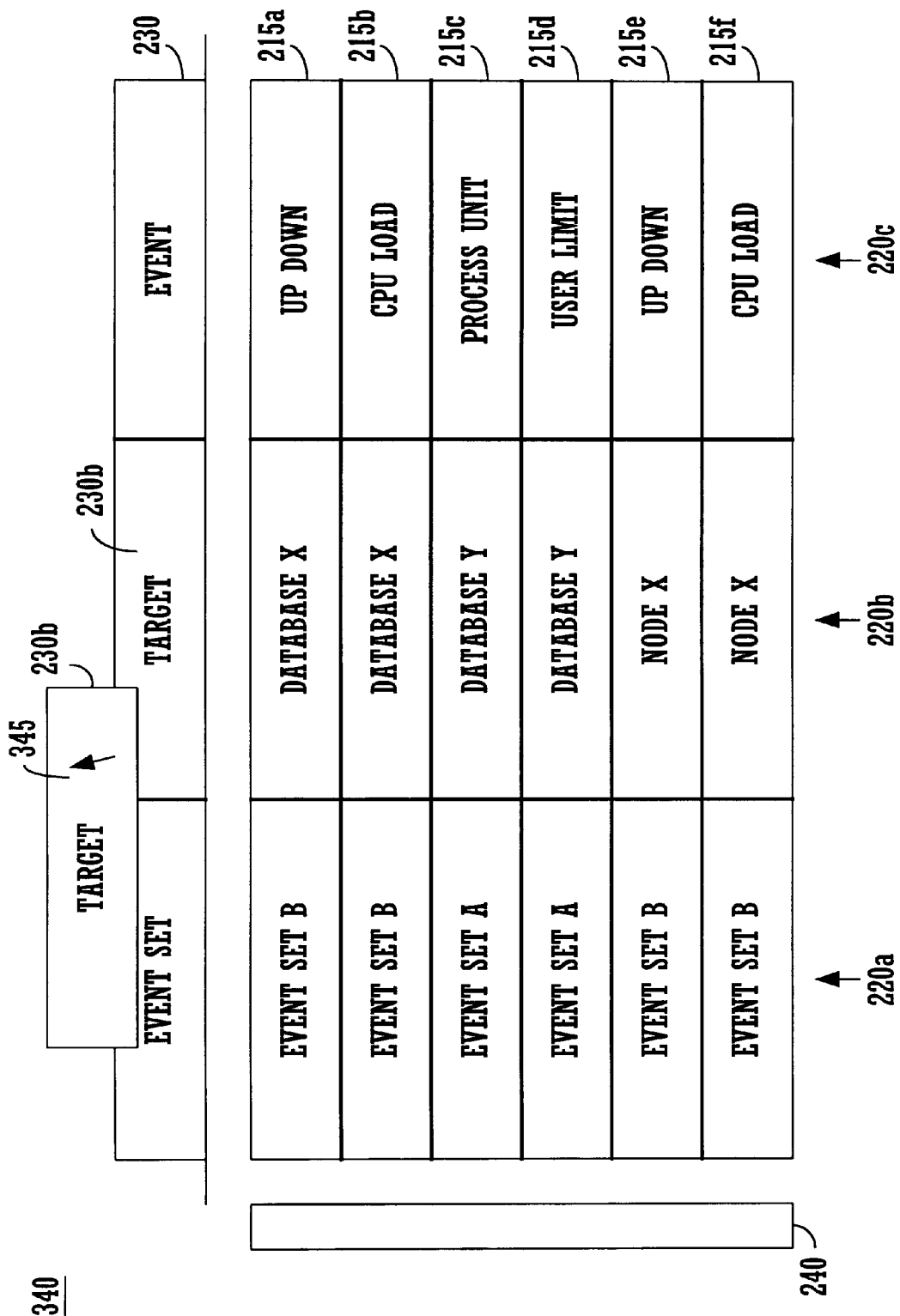
FIG. 3A is a graphical user interface view of the present invention showing a user moving the "target" column to the left-most position with no columns index enabled.

FIG. 3A illustrates an exemplary user interface display 340 in accordance with the present invention. The top level of the hierarchy would be column 220a as the left most column and the bottom of the hierarchy would be column 220c as the right most column. As shown, the user has selected the target header 230b with the cursor 345 and is in the process of dragging the target header 230b over to the left. In this example, the divider line 240 is in the left most extreme position with no columns being index enabled. At the instant shown in FIG. 3A, the target header 230b is shown to the right of the center line of column 220a. In this example, when the target header 230b is positioned to the left of the center line of column 220a, it is dropped (e.g., mouse up) by the user. The result of this column movement is shown in FIG. 3B.

Figure 3B:
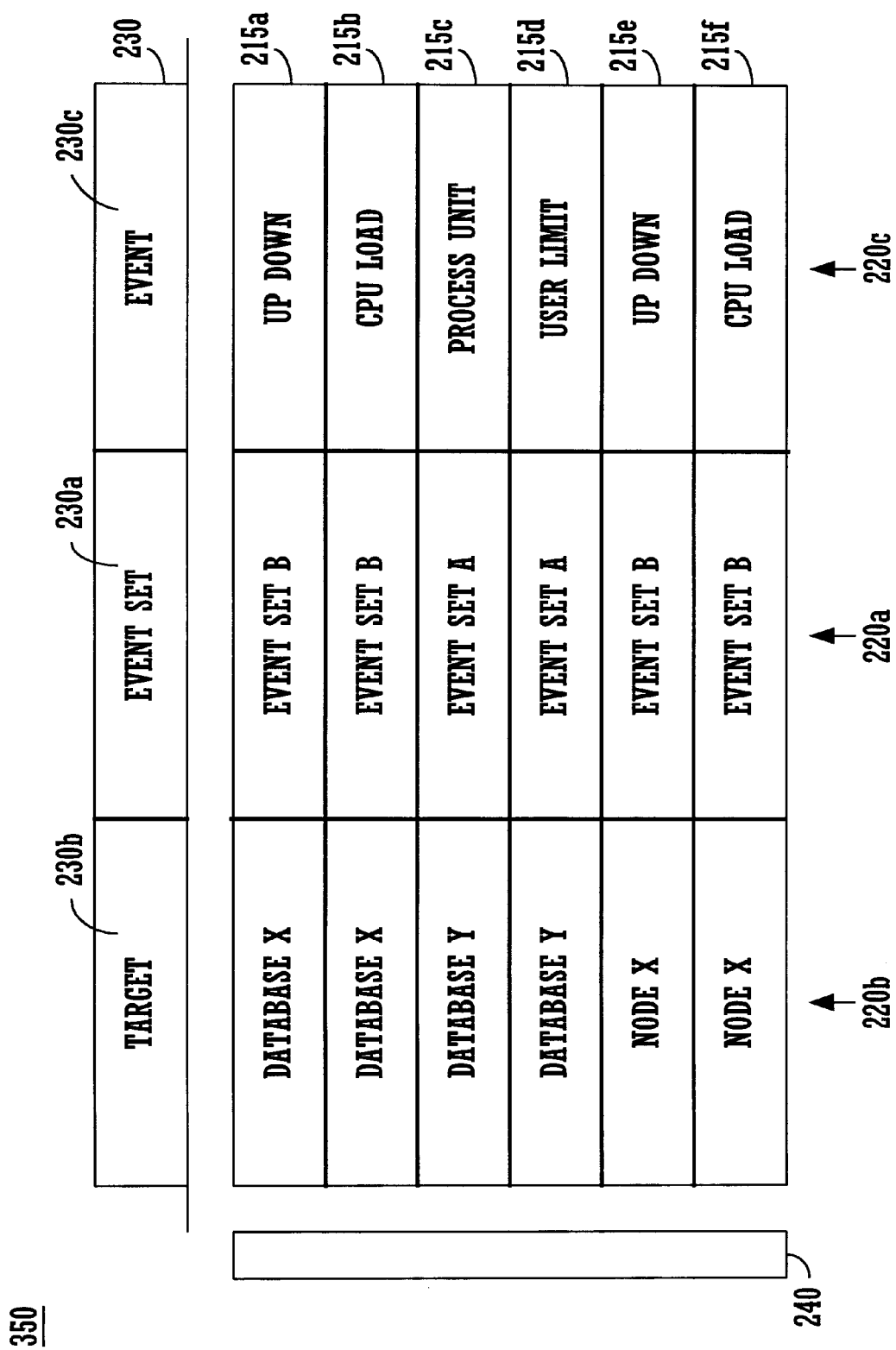
FIG. 3B is a graphical user interface view of the present invention after the "target" column has been moved to the left-most position with no columns index enabled.

FIG. 3B illustrates an exemplary user interface display 350 which is analogous to user interface display 340 (FIG. 3A) except the target column 220b has been moved from the middle position to the left most position. Also, the event set column 220a has been moved to the right to take on the middle position. Not changing positions as a result of the column movement operation are the divider line 240 and the event column 220c. In this configuration, the top level of the hierarchy would be column 220b as the left most column and the bottom of the hierarchy would be column 220c as the right most column.

In the configuration of FIG. 3B, the event column 220c could be moved to the middle position by dragging the event header section 230c to a position left of the center line of column 220a. Alternatively, the event column 220c could be moved to the left most position by dragging the event header section 230c to a position left of the center line of column 220b. In the configuration of FIG. 3B, the event set column 220a could be moved to the left most position by dragging the event header section 230a to a position left of the center line of column 220b. Also, the target column 220b could be moved to the middle position by dragging the target header section 230a to a position left of the center line of column 220c.

Figure 3C:
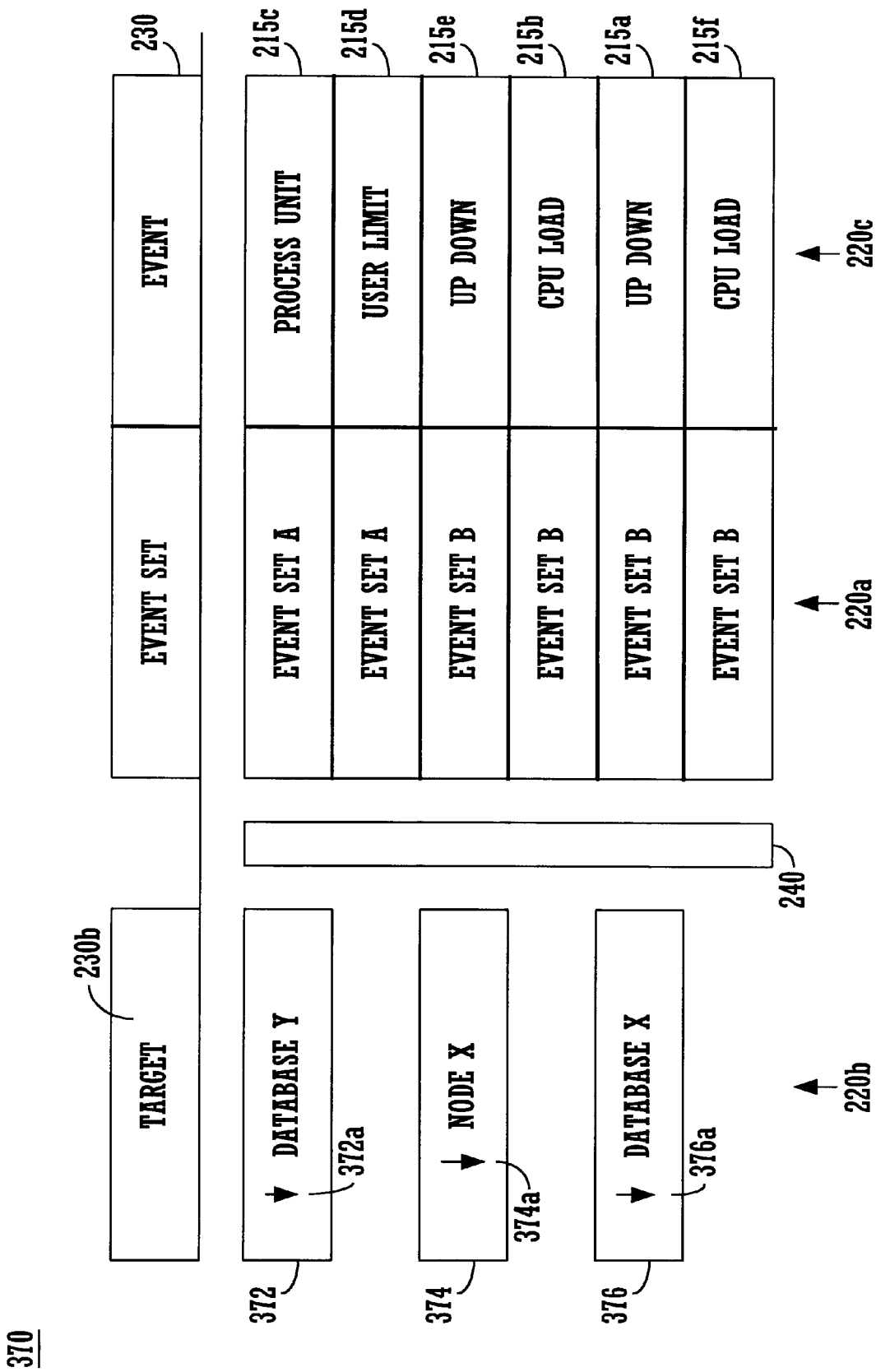
FIG. 3C is a graphical user interface view of the table of FIG. 3B with the "target" column index enabled and all index items open.
Figure 3D:
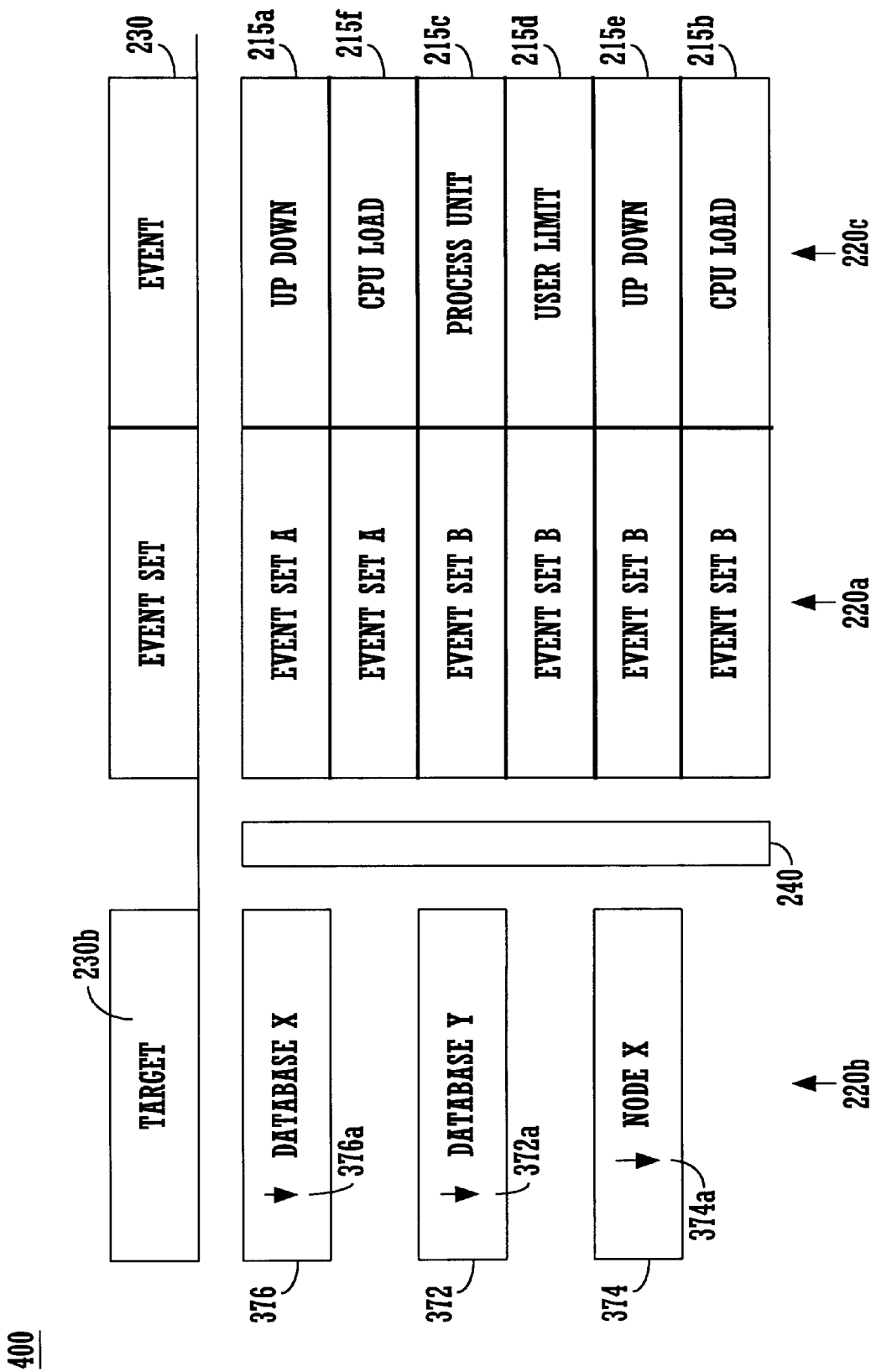
FIG. 3D is a graphical user interface view of the table of FIG. 3B with the "target" column index enabled and all index items open and sorted.

E. Column Reordering With Index Enabled Column. FIG. 3C illustrates an exemplary user interface display 370 which is analogous to user interface display 350 (FIG. 3B) except the divider line 240 has been dragged to a position between column 220b and column 220a. In this configuration, column 220b automatically becomes index enabled in accordance with the present invention. In this case, all duplicate instances are indexed to a single index item. The result is three unique index items including a database Y index item 372, a node X index item 374 and a database X index item 376. In this particular embodiment, column 220b is indexed but not necessarily sorted. A sorted example is shown in FIG. 3D. Within FIG. 3C, the user has decided to open the expansion buttons 372a, 374a and 376a, respectively, of index items 372, 374 and 376. Therefore, the associated information within columns 220a and 220c are displayed.

Since column 220b is index enabled, parent child relationships exist between the index items of column 220b and the other columns. For instance, "Event Set A" items of rows 215c and 215d (and the items of rows 215c and 215d of column 220c) are children of index item 372. "Event Set B" items of rows 215e and 215b (and the items of rows 215e and 215b of column 220c) are children of index item 374. Lastly, "Event Set B" items of rows 215a and 215f (and the items of rows 215a and 215f of column 220c) are children of index item 376.

FIG. 3D illustrates an exemplary user interface display 400 which is analogous to user interface display 350 (FIG. 3B) except the divider line 240 has been dragged to a position between column 220b and column 220a and in this embodiment, the index enable process automatically sorts as well as performs indexing operations. Therefore, the index items 372, 374 and 376 are sorted alphabetically by name. In this case, all duplicate instances are indexed to a single index item. The result is three unique index items in sorted order including a database x index item 376, followed by a database Y index item 372 and a node X index item 374. Within FIG. 3D, the user has decided to open the expansion buttons 372a, 374a and 376a, respectively, of index items 372, 374 and 376. Therefore, the associated information within columns 220a and 220c are displayed.

Figure 3E:
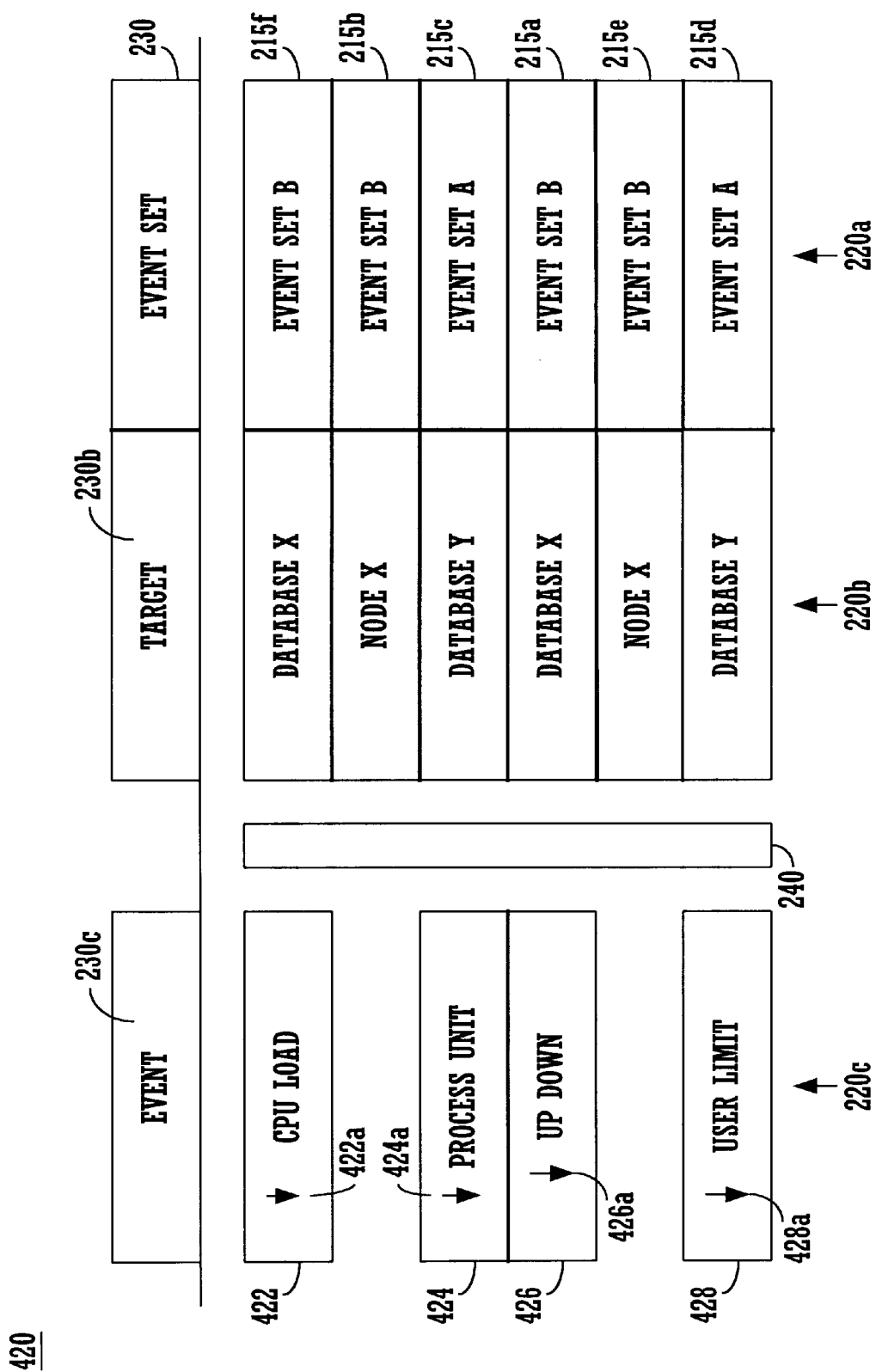
FIG. 3E is a graphical user interface view of the present invention with the "event" column moved to the left-most position and one column index enabled with all index items open.

FIG. 3E illustrates an exemplary user interface display 420 which is analogous to user interface display 400 (FIG. 3D) except that column 220c has been dragged by the user to the left most column position. Because the position of the divider line 240 remains constant during a column reorder, column 220c becomes positioned to the left of divider line 240 and therefore automatically becomes index enabled as a result of the column reorder. Also, because the new position of column 220b is located to the right of the divider line 240, it automatically becomes not index enabled (e.g., index disabled) as a result of the column reorder. The position of column 220a also moves over one position to the right as a result of the column reorder.

Column 220c has only four unique items, therefore by being index enabled the present invention displays the following four index items within column 220c: index item 422; index item 424; index item 426; and index item 428. Each index item also has a corresponding expansion button, 422a, 424a, 426a and 428a, respectively. As shown in FIG. 3E, each of the expansion buttons are shown in the open or expanded position and therefore the full item display is shown in columns 220b and 220a. It is appreciated that column 220a can also be dragged to the left most position in the configuration 420 shown in FIG. 3E thereby causing column 220a to be index enabled.

In this case, a new hierarchical order has been established by the column reordering. The index items 422, 424, 426 and 428 of column 220c are now the parent items and the corresponding items of column 220b and 220a are the children of these index items. For instance, the "Database X" and "Node X" items of rows 215a and 215e are children of index item 426. Also, the "Database Y" item of row 215c is a child of index item 424.

Figure 3F:
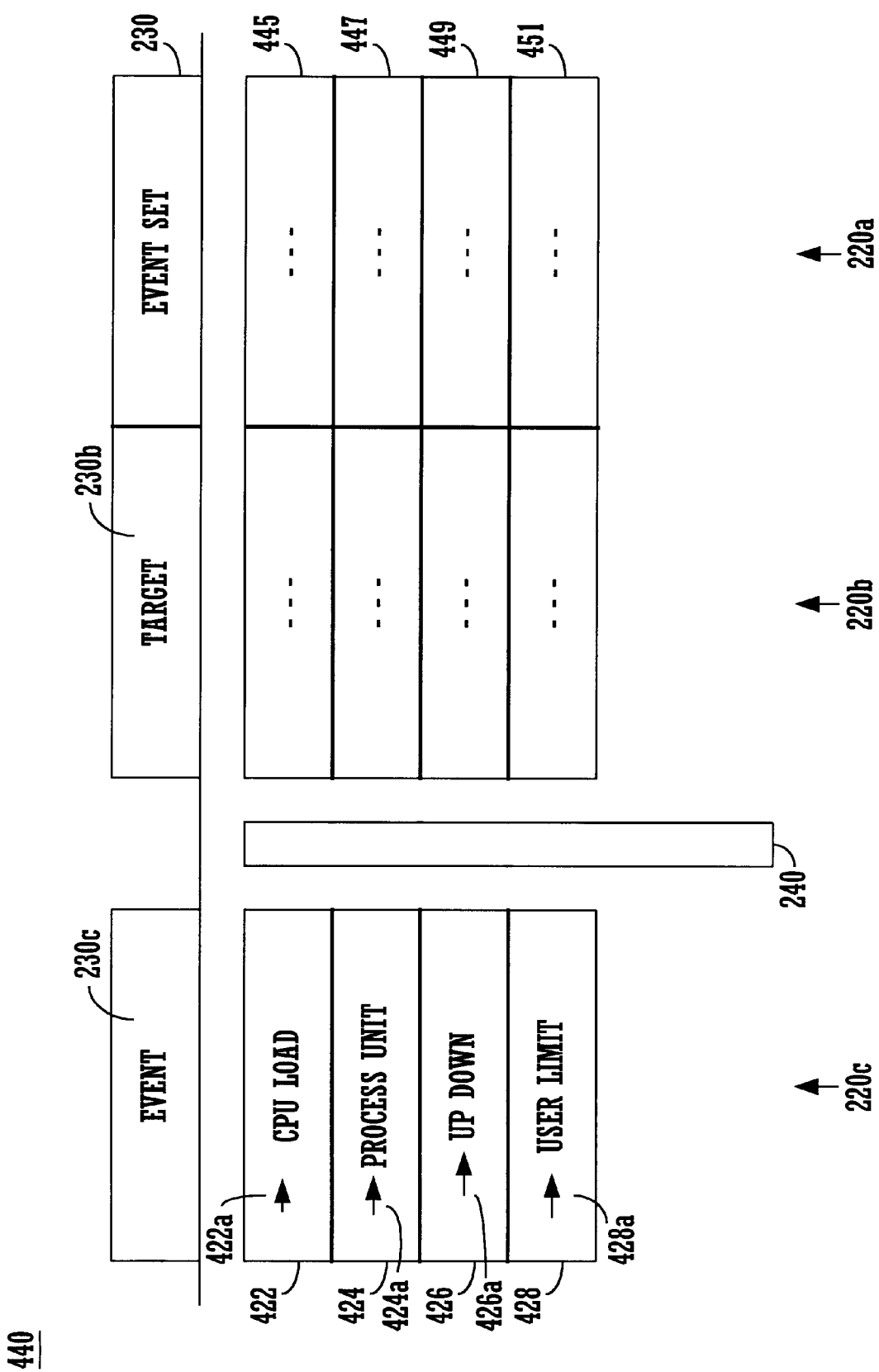
FIG. 3F is a graphical user interface view in accordance with the present invention of FIG. 3E with all index items closed.

FIG. 3F illustrates an exemplary user interface display 440 which is analogous to user interface display 420 (FIG. 3E) except that the expansion buttons 422a, 424a, 426a and 428a are all selected to the closed position. In this configuration 440, all of the items associated with (e.g., contained within) the index items 422, 424, 426 and 428 are hidden from view and replaced with small line representations 445, 447, 449 and 451 within columns 220b and 220a. In this configuration 440, the hierarchical display features of the present invention are used. The user can filter and index the information presented to display 105 by making certain column index enabled and also by closing certain expansion buttons. In configuration 440, all the user desires to see are the unique instances of the event column 220c without regard to any other information. It is appreciated that in configuration 440, the index items 422, 424, 426 and 428 are shown in compressed order (e.g., there are no empty line spaces between the index items). This display mode is typically available when the associated expansion buttons are closed thereby allowing a condensed presentation of the data of the user interface of the present invention.

Figure 4A:
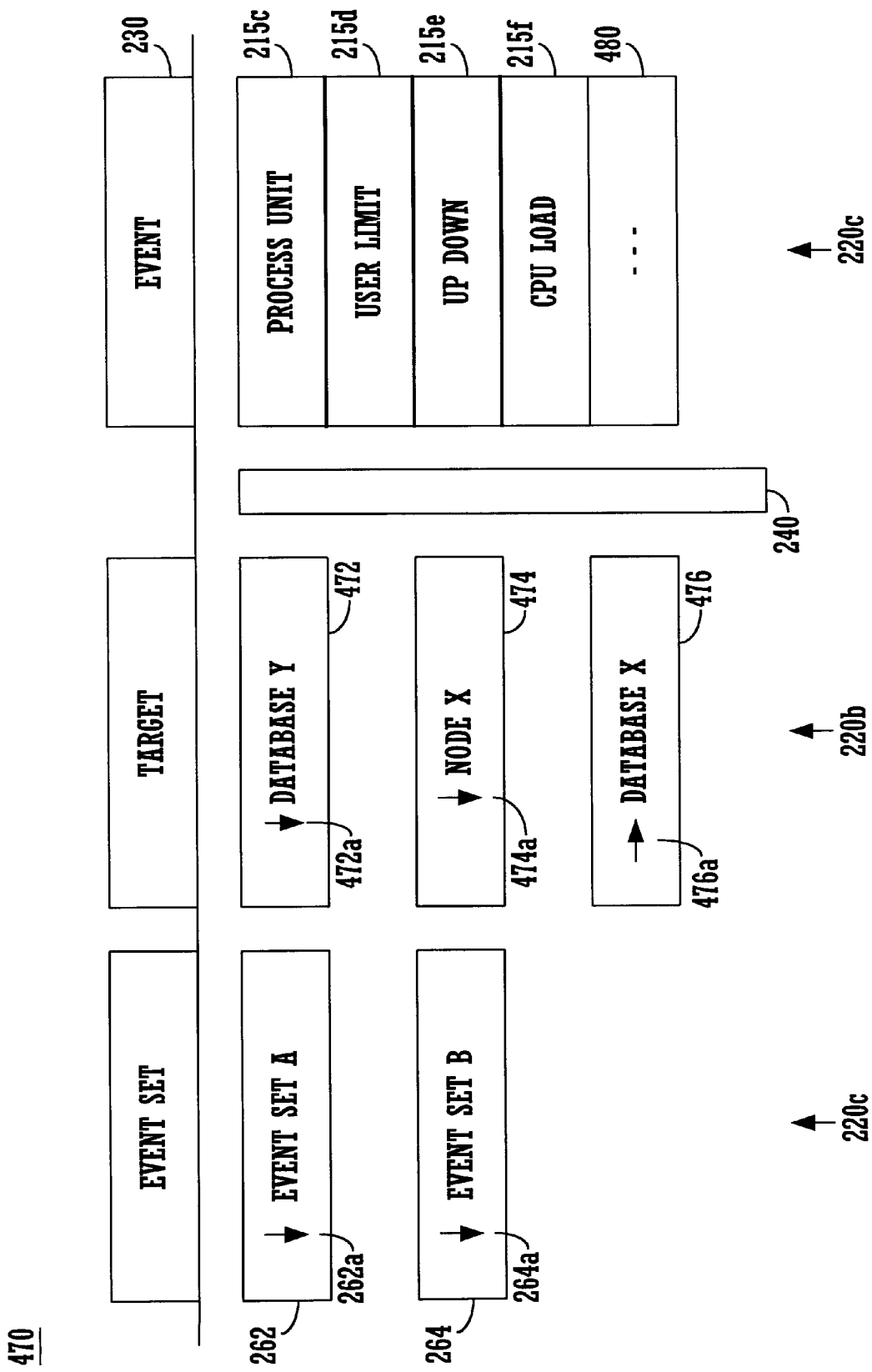
FIG. 4A illustrates a graphical user interface view in accordance with the present invention with two columns index enabled and one index item of the second column closed.

F. Multi-Column Index Enabling. FIG. 4A illustrates an exemplary user interface display 470 in accordance with the present invention having two columns that are index enabled. Columns 220a and 220b are both index enabled because both are positioned to the left of the divider line 240. This configuration 470 can be entered by dragging the divider line 240 to a position between column 220b and column 220c. In a dual column index enabling state, the left most column 220a is associated with a first level of hierarchy and the middle column 220b is associated with a second level of hierarchy. Because the left most column 220a has the first or top level of hierarchy, its items are indexed as described above and the result is two unique index items 262 and 264, each having an expansion button 262a and 264a, respectively.

Display 470 illustrates a first and a second hierarchical level organization. In this organization, index items of column 220b become children of index items of column 220a and items of column 220c become children of index items of column 220b. For instance, "Process Unit" item and "User Limit" item of column 220c are children of index item 472 which is, itself, a child of index item 262. Further, "Up Down" item and "CPU Load" item of column 220c are children of index item 474 which is, together with index item 476, a child of index item 264 of column 220a.

In this organization, items of the second index enabled column 220b, having a second level of hierarchy, are indexed separately, depending on their relationship with the index items of column 220a. Children are indexed separately depending on their parents. In other words, the index items of column 220b that are children of index item 262 are indexed separately from the index items of column 220b that are children of index item 264. Therefore, all index items of column 220b that are associated with index item 262 are indexed among themselves. In this case there is only one unique instance among them, the "Database Y" index item. Then, all index items of column 220b that are associated with index item 264 are indexed among themselves. In this case there are only two unique instances among them, the "Node X" index item and the "Database X" index item. By indexing in this manner, the present invention maintains a structured hierarchical ordering between columns from left to right with the left most column (220a) being at the top of the hierarchical order and the column at the right most position having the bottom hierarchical level.

Within an index enabled column that is not the left most column (e.g., column 220b), although not shown in FIG. 4A, it is possible to have two index items having the same label, e.g., one related to index item 262 and one related to index item 264. This is the case because these index items have different parents. For instance, it would be possible to have two "Database Y" index items in column 220b, one related to index item 262 and the other related to index item 264. In this particular example, the display would appear similar to display 470 except the "Database X" index item would read "Database Y." This is a direct result of the hierarchical nature of the present invention.

The present invention can emulate a tree structure user interface by moving the divider line 240 so that all columns are index enabled. Further, the present invention is then configured such that the expansion buttons of each column are displayed opened. In this configuration, the hierarchical nature of the present invention is shown as each hierarchical level is indexed and the chidden of each index item of a lower hierarchical level are separately indexed, and so forth. Of course, the hierarchical organization can be altered by moving columns as described above.

FIG. 4A also illustrates the behavior of the present invention with respect to an expansion button of a second index enabled column when the expansion button of its parent index item is open. For instance, the expansion buttons 262*a* and 264*a* of the column 220*a* are both expanded. However, the expansion button 476*a* of index item 476 of column 220*b* is closed. Index item 476 is a child of index item 264. This causes all of the items of column 220*c* that are associated with index item 476 (e.g., its children) to become hidden from view or "collapsed" into a line representation 480. Because expansion buttons 474*a* and 472*a* are both open, the remainder of the items of column 220*c* are shown.

Figure 4B:
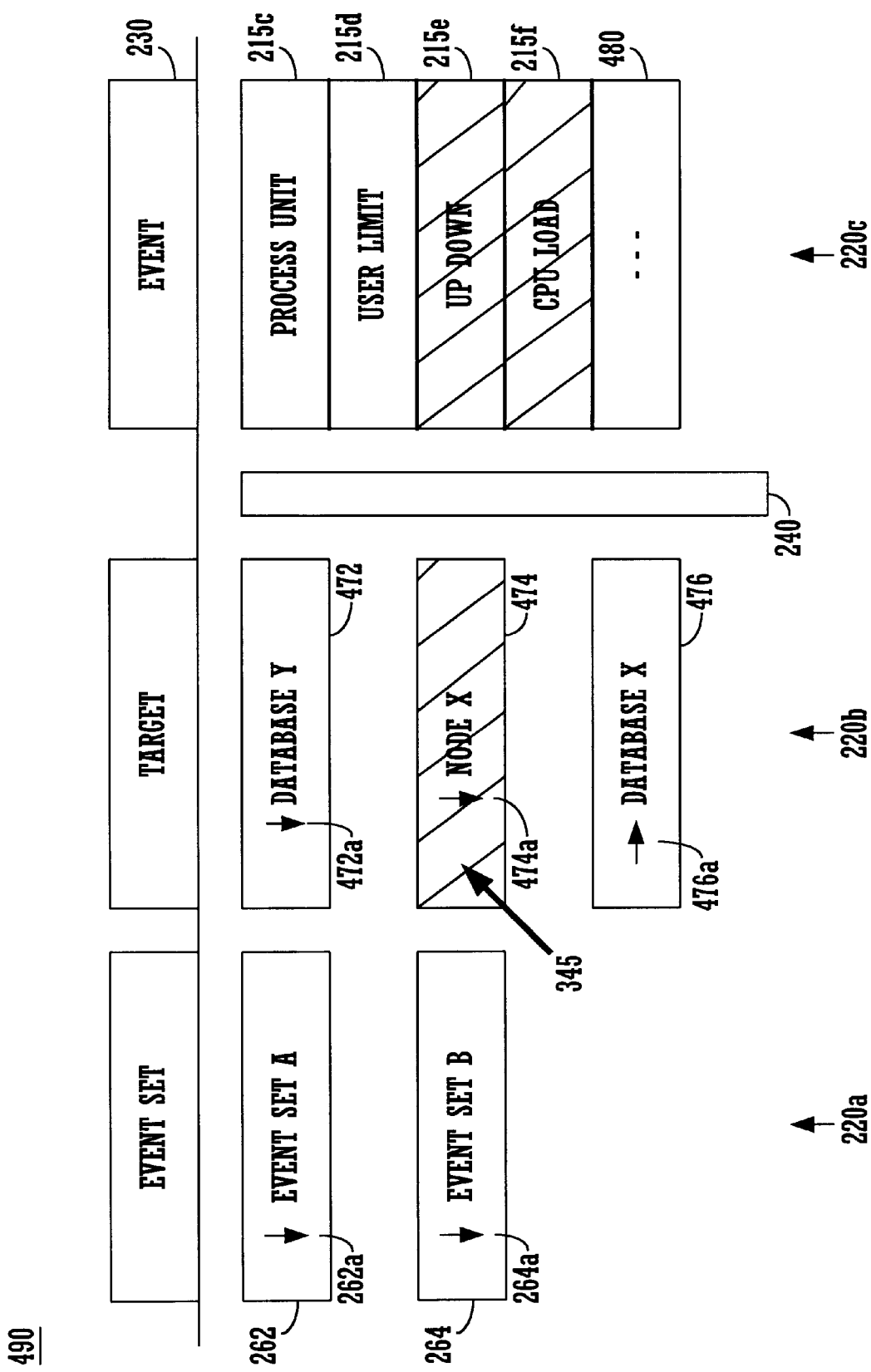
FIG. 4B illustrates the table of FIG. 4A with a particular item user-selected in accordance with the present invention.

FIG. 4B illustrates the behavior of the present invention when a particular index item is selected by the user. In effect, when an index item is selected, all of the items that are contained in (e.g., associated with) that index item are also selected simultaneously. That is to say, when a parent item is selected, all of its children are also selected by the present invention. In configuration 490, the user uses cursor 345 to select index item 474. This causes not only index item 474 to be selected, but also automatically selects all items associated with this index item to be selected that reside within lower hierarchical levels (e.g., the children of the selected item that are displayed on screen 105 also become selected). Therefore, items within rows 215*e* and 315*f* of column 220*c* are selected in addition to index item 474. As shown in FIG. 4B, selection involves a shading of the selected items. Those selected items are shown with hash lines. It is appreciated that any distinct visual graphical representation (e.g., different color, different shading, different outlining, etc., for the selected items) can be used within the present invention to distinguish a selected item from a non-selected item and the hash lines of FIG. 4B are exemplary only.

Figure 4C:
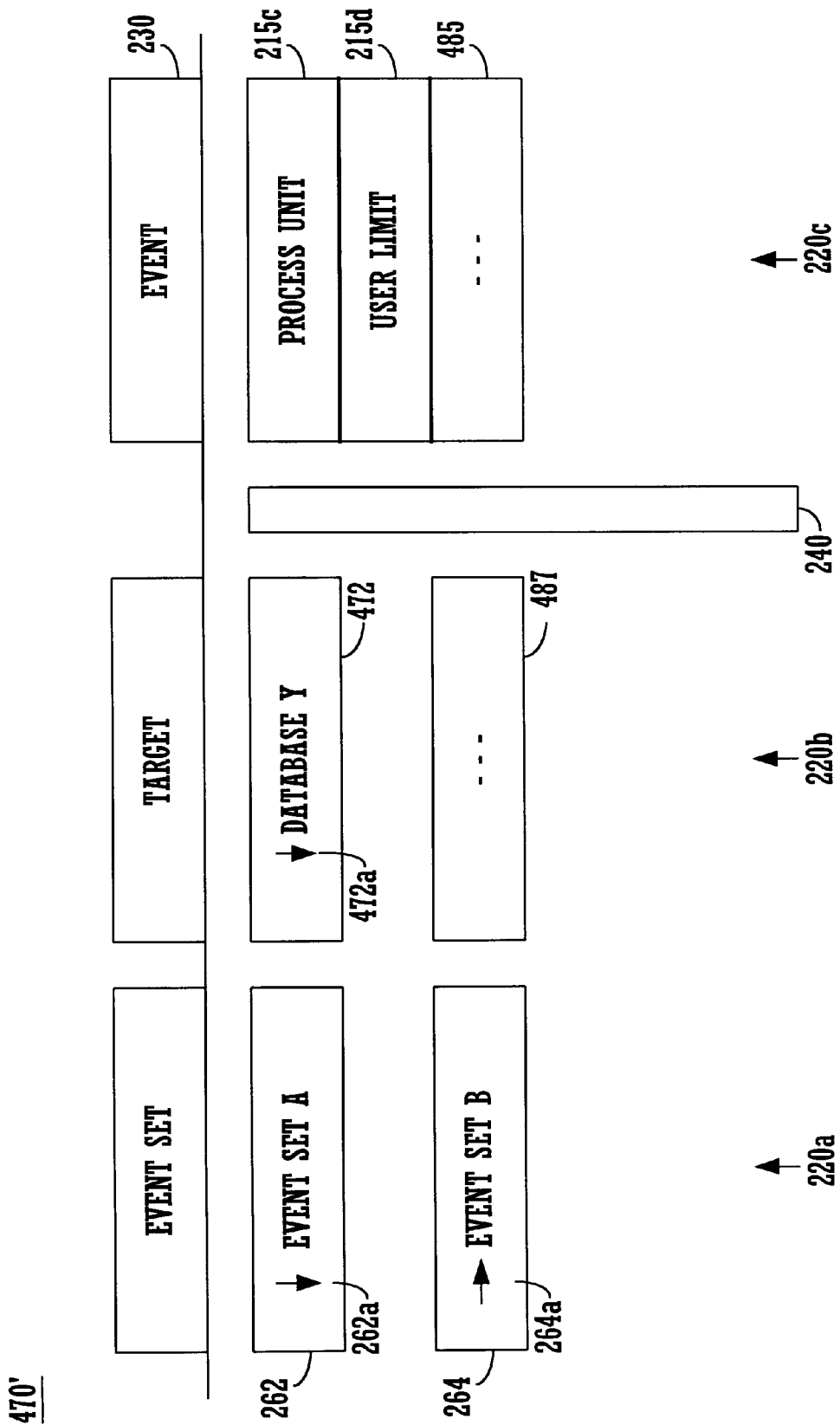
FIG. 4C illustrates the table of FIG. 4B with one index item of the first column closed in accordance with the present invention.

FIG. 4C illustrates the behavior of the present invention when two columns are index enabled and the associated index item of a higher hierarchical level column has a closed expansion button (the opposite case to FIG. 4A). In this case, the expansion button of the parent index item is closed. Specifically, in configuration 470', expansion button 264*a* is closed. This automatically hides any items contained within parent index item 264. Therefore, index item 474 (of FIG. 4A) is hidden from view and displayed as a line representation 487. This is true regardless of the state of the expansion button 474*a*. Also, any items associated with index item 474 within column 220*c* are also hidden from view and displayed as a line representation 485. Again, this is true regardless of the state of the expansion button 474*a*. Configuration 470' illustrates that within the present invention, the state of an expansion button within an associated index item of a higher hierarchical level dominates the lower hierarchical level expansion button. Stated another way, when an expansion button of an index item is closed within the present invention, all of the contents of the index item are hidden from view regardless of the state of any expansion buttons within the contents.

Figure 5:
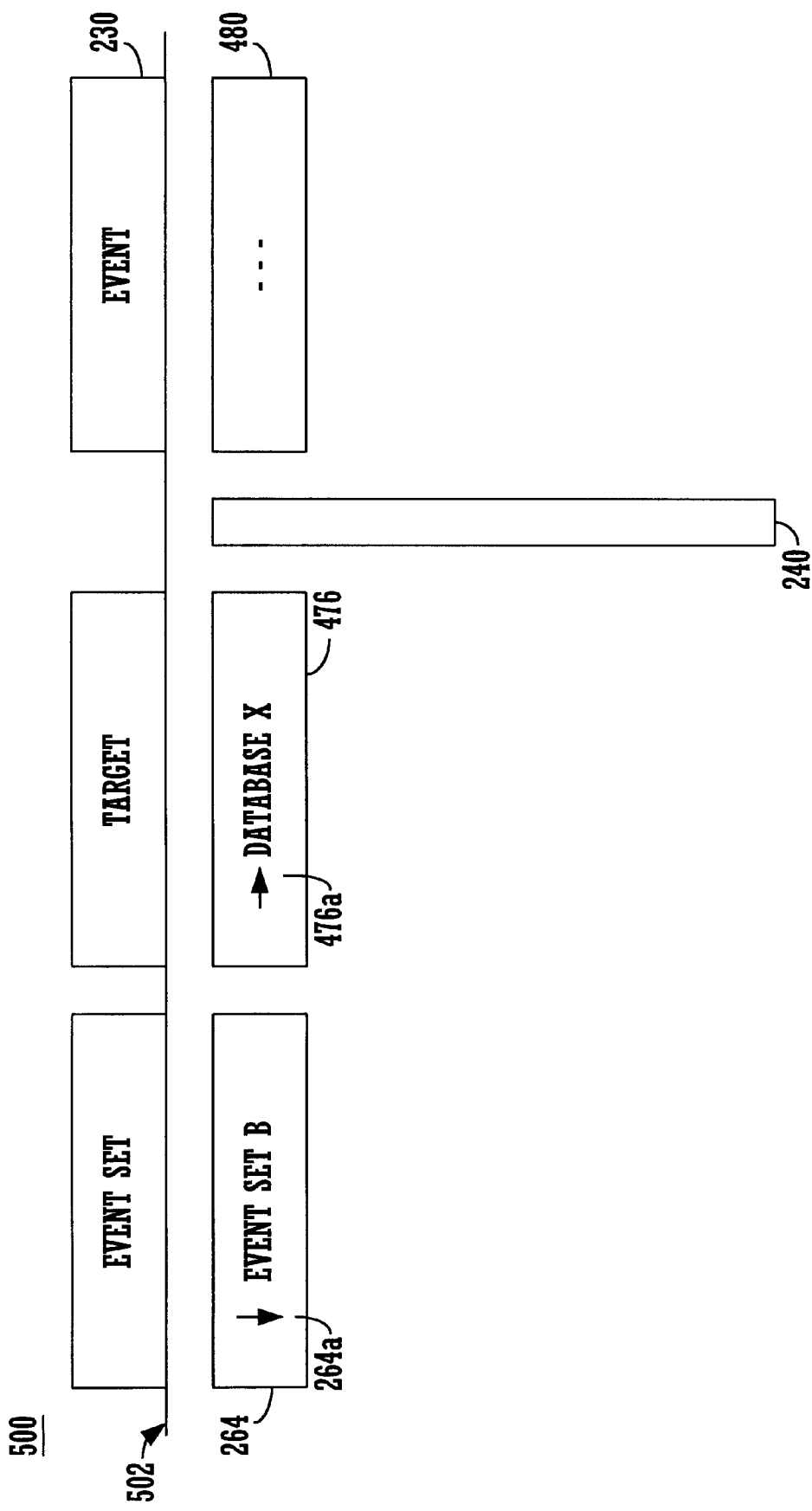
FIG. 5 is an illustration of the table of FIG. 4A with the information in the process of being scrolled upward and the parent being pinned to the edge of the visual display just underneath the header region.

G. Scrolling. The user can scroll the rows of the user interface of the present invention up and down to bring new rows onto display 105 and to roll displayed rows off of display 105. Within the present invention, if a parent item in one column has children in another column, the parent remains in view on display 105 as long as its children are in view on display 105. Therefore, the parent item becomes "pinned" or held to the edge 502 (FIG. 5) of the displayed area during a scroll operation. For instance, assume the configuration 470 of FIG. 4A is displayed on screen 105 and the contents are scrolled in a manner such that the rows 215 are scrolled upward. This continues until the configuration 500 of FIG. 5 is reached. As shown in FIG. 5, the parent index item 264 is held to the edge 502 as long as its child, index item 476, is displayed. In this case, index item 264 is displaced downward two rows from its original position so that it can remain in view with its child. This is true no matter which column contains the in-view child.

V. OTHER EXAMPLES

Figure 6A:
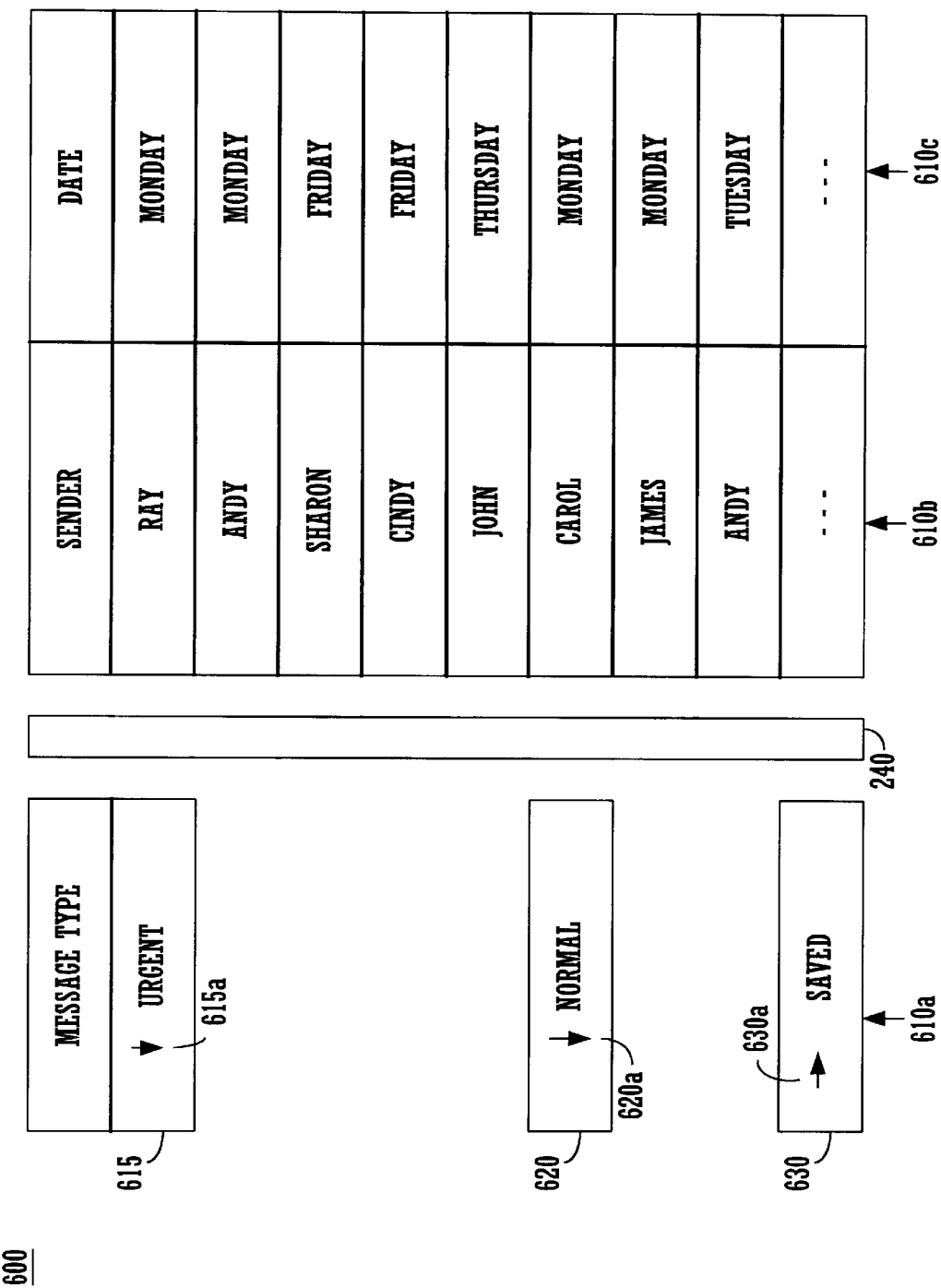
FIG. 6A is an illustration of an exemplary electronic mail (email) table in accordance with the present invention having on column index enabled.

FIG. 6A illustrates another exemplary display 600 of the user interface of the present invention. In this example, configuration 600 displays contents of an electronic mail (email) box. Column 610*a* displays message type information, column 610*b* displays sender information and column 610*c* displays date information with respect to individual messages. An individual message is represented by a single row of information across all columns. In configuration 600 column 610*a* is at the highest hierarchical level and is index enabled because it is positioned to the right of divider line 240. Column 610*a* contains only three unique instances, "urgent" index item 615, "normal" index item 620 and "saved" index item 630. Because the cardinality of the items within column 610*a* is low (three items), the amount of indexing available is significant.

In configuration 600, the user can quickly inspect which messages are urgent and which are normal delivery because the message type column 610*a* is index enabled. Therefore, if the user wanted to see all "urgent" messages, column 610*a* would be positioned to the left most position and then index enabled. Further, the expansion buttons 615*a* and 620*a* are open to display all of the children of index items 615 and 620. However, the expansion button 630*a* for the "saved" index item 630 is closed thereby hiding from view all of the previously read and saved messages. This is useful because these messages are of less importance over the other messages that are displayed. In the column organization of FIG. 6A, the message type column 610*b* is at the top level of the hierarchical tree.

Figure 6B:
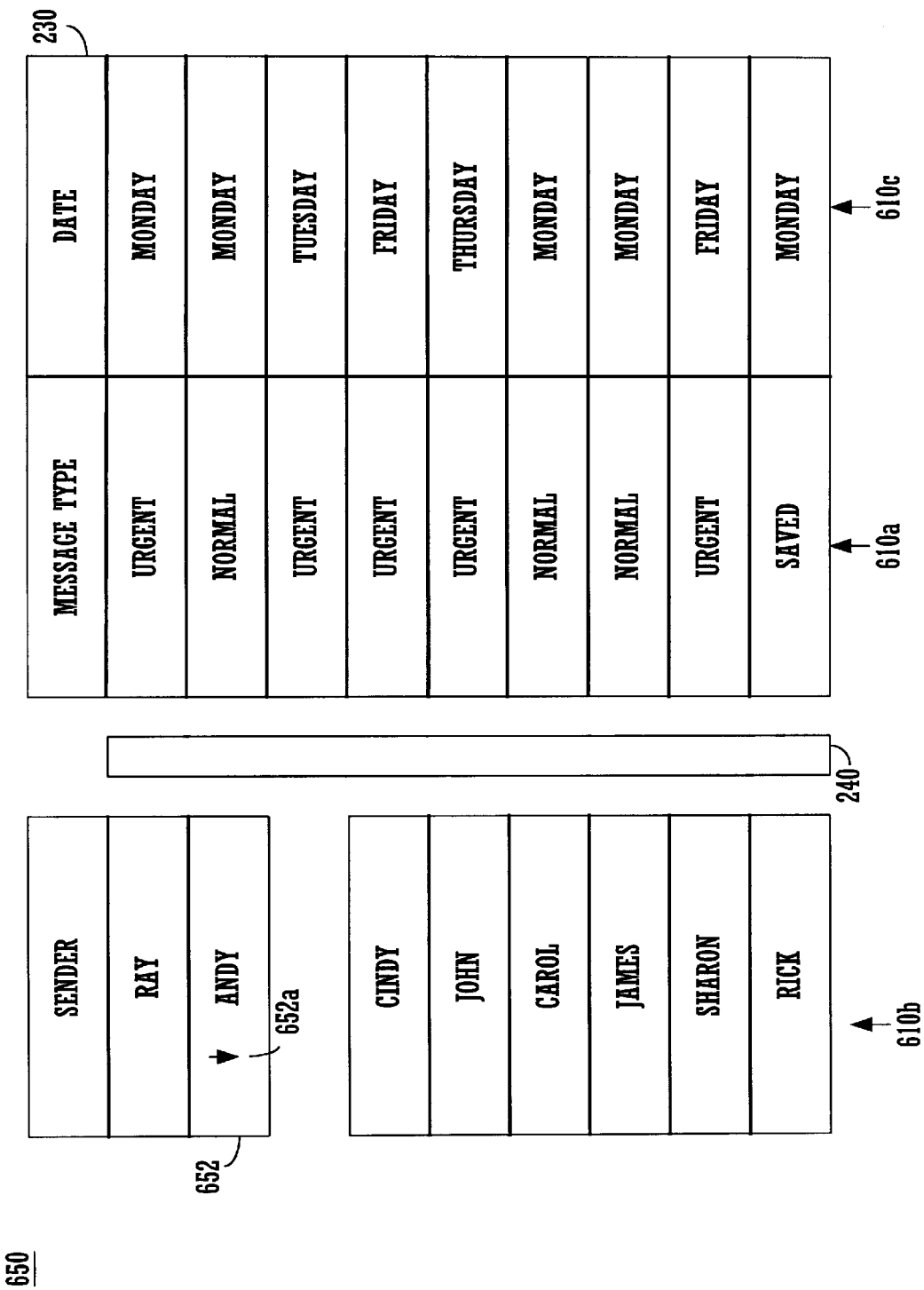
FIG. 6B is an illustration of the table of FIG. 6A with another column index enabled.

However, if the user wanted to see all messages sent from a particular person, then the sender column 610*b* could be moved to the left most position. This configuration 650 is shown in FIG. 6B. In this case, the sender "Andy" has two messages and the items associated with these messages are shown in columns 610*a* and 610*c* because the expansion button 652*a* is open. In the column organization of FIG. 6B, the sender column 610*b* is at the top level of the hierarchical tree. However, because the cardinality of the items within column 610*b* is high (8 items), the amount of indexing available is not significant.

VI. FLOW CHART

Figure 7:
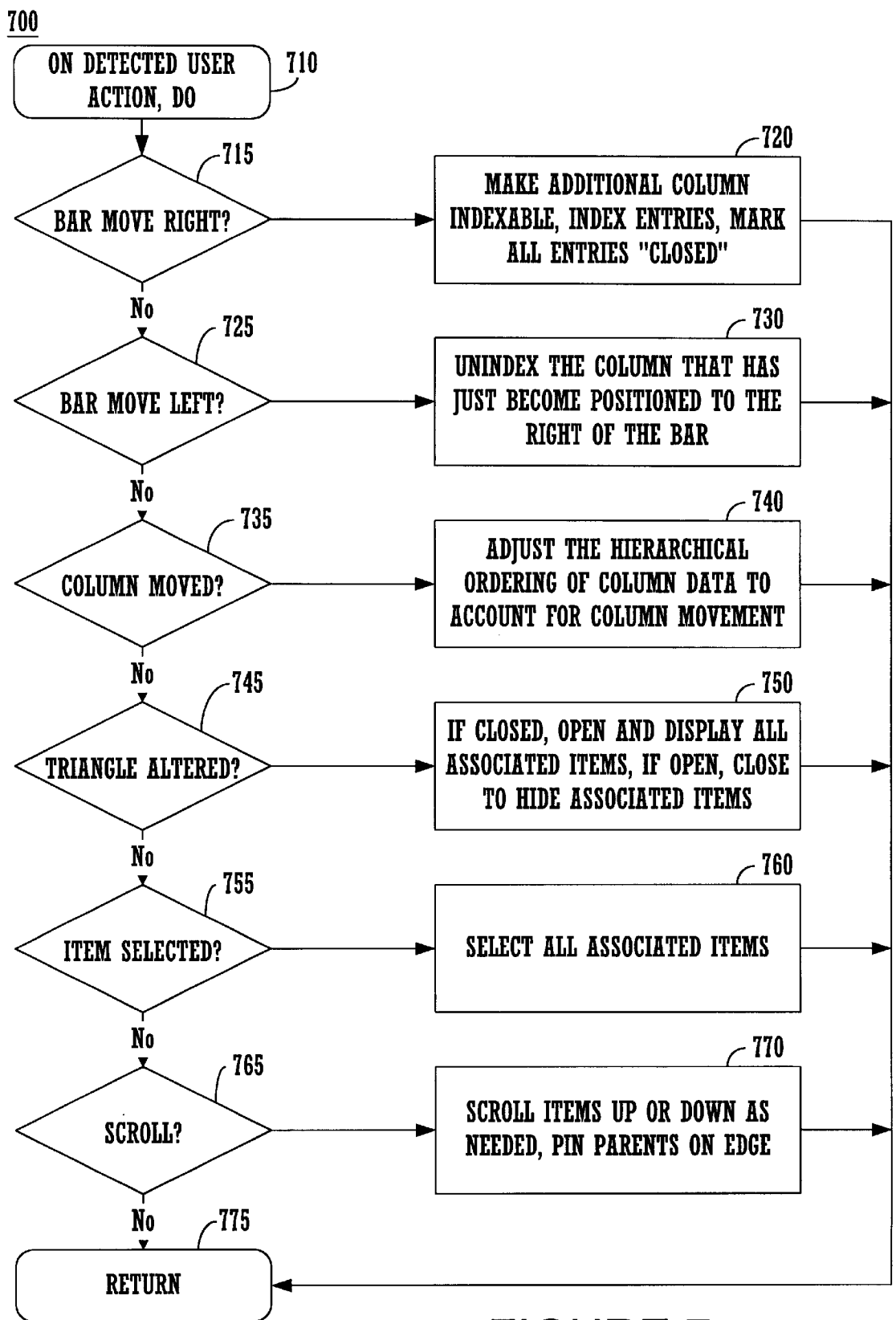
FIG. 7 illustrates a flow chart of steps performed in accordance with the present invention for generating the graphical user interface views described above.

FIG. 7 illustrates steps 700 performed by the present invention user interface upon certain user interactions. It is appreciated that steps 700 are implemented as program code stored within computer readable memory units of system 112 (FIG. 8) which are executed by processor 101. At step 710, a particular user action is interpreted by system 112. Typically the user action originates from a movement of the cursor directing device 107 (FIG. 8) or from a keystroke on keyboard 106.

At step 715 of FIG. 7, if the user action is to drag and drop the divider bar 240 to the right, then step 720 is entered, else step 725 is entered. At step 720, the present invention makes the new columns indexable that are newly to the left of the new position of the divider line 240. In making a column indexable that is not the left most column, the index items within that column are indexed by maintaining the hierarchical organization of higher level hierarchical columns. That is, children of this column that have different parents are indexed separately and grandchildren of children are indexed separately. In this manner, the present invention maintains the hierarchical organization of the particular column order. Step 720 is illustrated by the transition from FIG. 2A to FIG. 2B and between FIG. 2B and FIG. 4A. After step 720, step 775 is entered.

At step 725 of FIG. 7, if the user action is to drag and drop the divider bar 240 to the left, then step 730 is entered, else step 735 is entered. At step 730, the present invention removes the index enabling of each column newly positioned to the right of the divider line 240. When a column's index enabled status is removed, its items are no longer indexed and remain within a flattened hierarchical order at the bottom of any hierarchical ordering remaining within the user interface. Step 730 is illustrated by the transition from FIG. 2B to FIG. 2A. After step 730, step 775 is entered.

At step 735 of FIG. 7, if the user action is to move a column, then step 740 is entered, else step 745 is entered. At step 740, the hierarchical ordering of any indexed columns are updated to reflect the new positions of the columns. During a column movement, the divider bar 240 remains constant. With respect to hierarchical ordering of any index enabled columns, the present invention maintains a higher hierarchical level for those index enabled columns which are positioned to the left and maintains a lower hierarchical level for those index enabled columns which are positioned to the right. If a column that is not index enabled is moved to the left of the divider line 240, then the present invention makes that column index enabled. This is shown between FIG. 3D and FIG. 3E with respect to moved column 220c. At step 740, a column movement can also bump an index enabled column to the right of the divider line causing this column to no longer be index enabled. This is shown between FIG. 3D and FIG. 3E with respect to bumped column 220b. After step 740, step 775 is entered.

At step 745, of FIG. 7, if the user action is to alter an expansion button (e.g., a triangle or an arrow, etc.), then step 750 is entered, else step 755 is entered. At step 750, if the expansion button is closed, then all children items of the index item associated with the expansion button are hidden from view. This is shown between FIG. 2B and FIG. 2C with respect to expansion button 264a. It is also shown between FIG. 3E and FIG. 3F with respect to expansion buttons 422a, 424a, 426a and 428a. Also, at step 750, if the expansion button is open, then all children items of the index item associated with the expansion button are displayed on display 105 provided they are not hidden by another expansion button. In other words, although expansion button 264a of FIG. 4A is open, the children of index item 476 are not displayed because expansion button 476 is closed and this is the case even though the chidden of index item 476 are also children of index item 264. After step 750, step 775 is entered.

At step 755, of FIG. 7, if the user action is to select an item of the user interface, then step 760 is entered, else step 765 is entered. At step 760, all of the viewable children of the selected item are also selected. This is shown in FIG. 4B where index item 474 is selected causing of its children to also be selected within column 220c. After step 760, step 775 is entered.

At step 765, of FIG. 7, if the user action is to scroll the user interface of the present invention, then step 770 is entered, else step 775 is entered to return from process 700. At step 770, scrolling is performed. As shown in FIG. 5, a parent index item is maintained on the display 105 as long as any of its children are displayed. After step 770, step 775 is entered.

The preferred embodiment of the present invention, a system and method for implementing selectively indexable multi-column lists in a graphical user interface of a computer system, is thus described. While the present invention has been described in particular embodiments, it should be appreciated that the present invention should not be construed as limited by such embodiments, but rather construed according to the below claims.

What is claimed is:

1. A computer implemented method of providing a user interface, said method comprising the steps of:
   a) generating and displaying a plurality of columns of information;
   b) generating and displaying a divider line;
   c) allowing said divider line to be positioned by a user between said plurality of columns wherein the position of said divider line defines which columns are index enabled and which columns are not index enabled;
   d) index enabling said columns that are defined as index enabled, said step d) comprising the steps of:
      d1) indexing all items within a respective index enabled column depending on the hierarchical level of said respective index enabled column, said hierarchical level being dependent on the position of said respective index enabled column; and
      d2) displaying only index items within said respective index enabled column; and
      d3) repeating steps d1) and d2) for each index enabled column; and
   e) allowing a first column of said plurality of columns to be moved from a current position to a new position.

2. A method as described in claim 1 wherein step d2) comprises the steps of:
   displaying an expansion button within each displayed index item of said respective index enabled columns;
   hiding from view any information associated with a displayed index item upon an expansion button of said index item being selected to a closed state; and
   displaying information associated with a displayed index item upon an expansion button of said index item being selected to an open state.

3. A method as described in claim 2 wherein said expansion button is a graphical representation having a pointing end.

4. A method as described in claim 1 wherein said divider line has a length dimension substantially parallel to said plurality of columns.

5. A method as described in claim 1 wherein step e) comprises the steps of:
   maintaining a position of said divider line during movement of said first column;
   index enabling said first column provided said first column is moved from a first side of said divider line to a second side of said divider line; and
   not index enabling said first column provided said first column is moved from said second side of said divider line to said first side of said divider line.

6. A method as described in claim 5 wherein said movement of said first column comprises the steps of:

selecting a header associated with said first column;

dragging said header to a new position within said plurality of columns on said display screen; and dropping said header into said new position.

7. A computer implemented method of providing a user interface comprising the steps of:

a) generating and displaying a plurality of columns of information;

b) generating and displaying a divider line having a width less than any column of said plurality of columns;

c) allowing said divider line to be positioned by a user between said plurality of columns wherein any column positioned to the left of said divider line is defined as indexed enabled and any column positioned to the right of said divider line is defined as not index enabled;

d) index enabling said columns of said plurality of columns that are defined as index enabled, said step d) comprising the steps of:

d1) indexing all items within a respective index enabled column depending on the hierarchical level of said respective index enabled column, wherein said hierarchical level is dependent on the position of said respective index enabled column with the left most index enabled column being at the highest hierarchical level;

d2) displaying only index items within said respective index enabled column; and d3) repeating steps d1) and d2) for each index enabled column; and e) allowing a first column of said plurality of columns to be moved from a current position to a new position.

8. A method as described in claim 7 wherein said step d2) comprises the steps of:

provided said respective index enabled column is the left most index enabled column, displaying only unique items as said index items; and provided said respective index enabled is adjacent to the left most index enabled column, displaying only unique items of those items having the same parent as said index items.

9. A method as described in claim 7 wherein step d2) comprises the steps of:

displaying an expansion button within each of said index items of each index enabled column;

hiding from view any information associated with an index item upon an expansion button of said index item being selected to a closed state; and displaying information associated with an index item upon an expansion button of said index item being selected to an open state.

10. A method as described in claim 9 wherein said expansion button is a graphical representation having a pointing end.

11. A method as described in claim 7 wherein said divider line has a length dimension substantially parallel to said plurality of columns.

12. A method as described in claim 7 wherein step e) comprises the steps of:

maintaining a position of said divider line during movement of said first column;

index enabling said first column provided said first column is moved from a right side of said divider line to a left side of said divider line; and not index enabling said first column provided said first column is moved from said left side of said divider line to said right side of said divider line.

13. A method as described in claim 12 wherein said movement of said first column comprises the steps of:

selecting a header associated with said first column;

dragging said header to a new position within said plurality of columns on said display screen; and dropping said header into said new position.

14. A computer system comprising a processor coupled to a bus, a computer readable memory unit coupled to said bus and a display coupled to said bus, said computer readable memory unit containing instructions that when executed implement method of providing a user interface, said method comprising the steps of:

a) generating and displaying a plurality of columns of information;

b) generating and displaying a divider line;

c) allowing said divider line to be positioned by a user between said plurality of columns wherein the position of said divider line defines which columns are index enabled and which columns are not index enabled;

d) index enabling said columns that are defined as index enabled, said step d) comprising the steps of:

d1) indexing all items within a respective index enabled column depending on the hierarchical level of said respective index enabled column, said hierarchical level being dependent on the position of said respective index enabled column; and d2) displaying only index items within said respective index enabled column; and d3) repeating steps d1) and d2) for each index enabled column; and e) allowing a first column of said plurality of columns to be moved from a current position to a new position.

15. A computer system as described in claim 14 wherein step d2) of said method comprises the steps of:

displaying an expansion button within each displayed index item of said respective index enabled columns;

hiding from view any information associated with a displayed index item upon an expansion button of said index item being selected to a closed state; and displaying information associated with a displayed index item upon an expansion button of said index item being selected to an open state.

16. A computer system as described in claim 15 wherein said expansion button is a graphical representation having a pointing end.

17. A computer system as described in claim 14 wherein said divider line has a length dimension substantially parallel to said plurality of columns.

18. A computer system as described in claim 14 wherein step e) of said method comprises the steps of:

maintaining a position of said divider line during movement of said first column;

index enabling said first column provided said first column is moved from a first side of said divider line to a second side of said divider line; and not index enabling said first column provided said first column is moved from said second side of said divider line to said first side of said divider line.

19. A computer system as described in claim 18 wherein said movement of said first column comprises the steps of:

selecting a header associated with said first column;

dragging said header to a new position within said plurality of columns on said display screen; and dropping said header into said new position.

* * * * *